(12) United States Patent
Kim et al.

(10) Patent No.: US 8,107,394 B2
(45) Date of Patent: Jan. 31, 2012

(54) METHOD FOR RETRANSMITTING DATA IN THE MULTI-CARRIER SYSTEM

(75) Inventors: Hak Seong Kim, Gyeonggi-do (KR); Ki Jun Kim, Gyeonggi-do (KR); Suk Hyon Yoon, Gyeonggi-do (KR); Joon Kui Ahn, Gyeonggi-do (KR); Young Woo Yun, Gyeonggi-do (KR); Eun Sun Kim, Gyeonggi-do (KR); Dae Won Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/443,970

(22) PCT Filed: Oct. 2, 2007

(86) PCT No.: PCT/KR2007/004831
§ 371 (c)(1),
(2), (4) Date: Mar. 12, 2010

(87) PCT Pub. No.: WO2008/041824
PCT Pub. Date: Apr. 10, 2008

(65) Prior Publication Data
US 2010/0157916 A1    Jun. 24, 2010

(30) Foreign Application Priority Data

Jan. 5, 2007 (KR) .......... 10-2007-0001215
Oct. 2, 2007 (KR) .......... 10-2007-0099052

(51) Int. Cl.
*H04L 12/28* (2006.01)
*H04L 1/18* (2006.01)
*H04W 4/00* (2009.01)
*H04B 7/216* (2006.01)

(52) U.S. Cl. ......... 370/252; 370/329; 370/335; 714/748

(58) Field of Classification Search .......... None
See application file for complete search history.

(56) References Cited

U.S. PATENT DOCUMENTS 7,145,889 B1    12/2006 Zhang et al.
(Continued)

FOREIGN PATENT DOCUMENTS

EP    1545041    6/2005
(Continued)

OTHER PUBLICATIONS

U.S. Appl. No. 60/725,064, method to combime control channels for HSDPA and HSUPA, pp. 1-23.*

(Continued)

*Primary Examiner* — Steven H. D Nguyen
(74) *Attorney, Agent, or Firm* — Lee, Hong, Degerman, Kang & Waimey

(57) ABSTRACT

A method for modifying a synchronous non-adaptive retransmission scheme to solve the limitation of the synchronous non-adaptive retransmission scheme is disclosed. A method for indicating not only the new data transmission but also the retransmission using a data scheduling message is disclosed. A method for determining whether there is an error in the ACK signal transmitted from a data reception end using another message to-be received later is disclosed. The retransmission method for a multi-carrier system includes: receiving a grant message including scheduling information for transmitting uplink data wherein a retransmission scheme for the uplink data is predetermined by a first retransmission scheduling, transmitting the uplink data according to the scheduling information and retransmitting the uplink data according to second retransmission scheduling by receiving the second retransmission scheduling information associated with the uplink data with retransmission request.

8 Claims, 16 Drawing Sheets

U.S. PATENT DOCUMENTS

| | | | |
|---|---|---|---|
| 7,631,239 B2 * | 12/2009 | Yeo et al. | 714/748 |
| 2003/0210669 A1 * | 11/2003 | Vayanos et al. | 370/335 |
| 2004/0109433 A1 | 6/2004 | Khan | |
| 2004/0192208 A1 | 9/2004 | Kong et al. | |
| 2005/0105494 A1 * | 5/2005 | Kim et al. | 370/335 |
| 2005/0201453 A1 | 9/2005 | Gu | |
| 2005/0207345 A1 | 9/2005 | Onggosanusi et al. | |
| 2006/0146831 A1 * | 7/2006 | Argyropoulos et al. | 370/394 |
| 2006/0171349 A1 | 8/2006 | Holma et al. | |
| 2007/0093209 A1 * | 4/2007 | Agrawal et al. | 455/63.1 |
| 2007/0133458 A1 * | 6/2007 | Chandra et al. | 370/329 |
| 2007/0259665 A1 * | 11/2007 | Chiu et al. | 455/436 |
| 2008/0096571 A1 | 4/2008 | Pedersen et al. | |
| 2008/0253326 A1 | 10/2008 | Damnjanovic | |
| 2009/0109906 A1 | 4/2009 | Love et al. | |

FOREIGN PATENT DOCUMENTS

| | | |
|---|---|---|
| EP | 1545041 A2 | 6/2005 |
| JP | 2007500990 | 1/2007 |
| JP | 2007511183 | 4/2007 |
| JP | 2007517431 | 6/2007 |
| JP | 2007522715 | 8/2007 |
| JP | 2008501284 | 1/2008 |
| KR | 1020040099126 | 11/2004 |
| KR | 1020040099126 A | 11/2004 |
| KR | 1020050057926 | 6/2005 |
| KR | 1020050057926 A | 6/2005 |
| RU | 2216860 | 4/2002 |
| WO | 2004/012043 | 2/2004 |
| WO | 2005/036917 | 4/2005 |
| WO | 2005/048640 | 5/2005 |
| WO | 2005046115 | 5/2005 |
| WO | 2005/060145 | 6/2005 |
| WO | 2005/071874 | 8/2005 |
| WO | 2006/052502 | 5/2006 |
| WO | 2006070465 | 7/2006 |
| WO | 2007003134 | 1/2007 |
| WO | 2007003134 A1 | 1/2007 |
| WO | 2007078219 | 7/2007 |
| WO | 2007078219 A1 | 7/2007 |

OTHER PUBLICATIONS

U.S. Appl. No. 60/796,885, An efficient and robust HARQ-ARQ interaction. pp. 1-11.*

U.S. Appl. No. 60/815,597, An efficient detection schem to identify residual HARQ errors. pp. 1-5.*

* cited by examiner

METHOD FOR RETRANSMITTING DATA IN THE MULTI-CARRIER SYSTEM

CROSS-REFERENCE TO RELATED APPLICATIONS

This application is a 371 U.S. national stage application of International Application No. PCT/KR2007/004831, filed on Oct. 2, 2007, which claims priority to Korean Application Serial Nos. 10-2007-0099052, filed on Oct. 2, 2007 and 10-2007-0001215, filed on Jan. 5, 2007, and U.S. Provisional Application Ser. Nos. 60/944,791, filed on Jun. 18, 2007 and 60/827,858, filed on Oct. 2, 2006.

TECHNICAL FIELD

The present invention relates to a multi-carrier system, and more particularly to a retransmission method for use in the multi-carrier system.

BACKGROUND ART

A mobile communication system allows each base station or Node-B located in a single cell or sector to communicate with a plurality of user terminals (e.g., user equipments) over a wireless channel environment.

In the case of a multi-carrier system or other systems similar to the multi-carrier system, the base station receives packet traffic from a wired Internet network in the multi-carrier system or other similar systems, and transmits the received packet traffic to each terminal using a predetermined communication scheme.

In this case, the base station determines a downlink scheduling, so that it determines a variety of information according to the downlink scheduling, for example, a user terminal which will receive data from the base station, a frequency area to be used for data transmission to the terminal, and timing information indicating a transmission time of the data to be transmitted to the terminal.

The base station receives packet traffic from the user terminal according to a predetermined communication scheme, and demodulates the received packet traffic, so that it transmits the received packet traffic to the wired Internet network.

The base station determines an uplink scheduling, so that it determines a variety of information according to the uplink scheduling, for example, a user terminal which will transmit uplink data, a frequency band to be used for the uplink data transmission, and timing information indicating a transmission time of the uplink data. Generally, a user terminal having a superior or good channel status is scheduled to transmit/ receive data using more frequency resources during a longer time.

FIG. 1 is a conceptual diagram illustrating a time-frequency resource block for use in a multi-carrier system.

Communication resources for use in a multi-carrier system or other similar systems can be largely divided into a time area and a frequency area.

The communication resources can be defined by resource blocks. Each resource block includes N sub-carriers and/or M sub-frames, and is configured in units of a predetermined time. In this case, N may be set to "1", and M may also be set to "1".

A single square of FIG. 1 indicates a single resource block. A single resource block uses several sub-carriers as a single axis, and uses a unit of a predetermined time as another axis.

A base station in a downlink selects a user terminal according to a predetermined scheduling rule, allocates one or more resource blocks to the selected user terminal. The base station transmits data to the selected user terminal using the allocated resource blocks.

According to uplink transmission, the base station selects the user terminal, and allocates one or more resource blocks to the selected user terminal according to a predetermined scheduling rule. The user terminal receives scheduling information, indicating that a predetermined resource block has been allocated to the user terminal itself, from the base station, and transmits uplink data using the allocated resource.

Although data has been transmitted according to the scheduling rule, the data may be unexpectedly damaged or lost during the transmission process. In this case, there are proposed a variety method for controlling the faulty or erroneous operation, for example, an automatic repeat request (ARQ) scheme and a hybrid ARQ (HARQ) scheme, etc. The confirmation of the faulty or erroneous operation according to the above-mentioned two schemes is operated in frame units. Data transmitted during the frame unit is hereinafter referred to as a frame.

The ARQ scheme waits for transmission of the ACK signal after transmitting a single frame. If a reception end correctly receives data of the frame, it transmits the ACK signal. However, if an unexpected error occurs in the frame, the reception end transmits a negative-ACK (NACK) signal, and deletes the received erroneous frame from its own buffer.

If the transmission end receives the ACK signal, it transmits the next frame. Otherwise, if the transmission end receives the NACK signal, it retransmits the frame.

The HARQ scheme allows the reception end to transmit the NACK signal to the transmission end on the condition that the received frame cannot be demodulated. However, differently from the ARQ scheme, the HARQ scheme does not delete the pre-received frame from the buffer, and stores the pre-received frame in the buffer for a predetermined period of time. Therefore, if the above-mentioned frame is re-transmitted, in the HARQ scheme the reception end combines the pre-received frame with a re-transmitted frame, thereby it could increase the success rate of data reception.

In recent time, many users prefer to the HARQ scheme to the basic ARQ scheme.

There are a variety of types in the HARQ scheme. For example, the HARQ scheme can be classified into a synchronous HARQ scheme and an asynchronous HARQ scheme.

If initial transmission of data fails, the synchronous HARQ scheme is designed to perform the next retransmission of data at a timing point determined by a system. For example, if it is assumed that the retransmission timing point is set to a fourth time unit after the initial transmission failure occurs, there is no need to additionally indicate the fourth time unit because the retransmission timing between the base station and the user terminal is pre-engaged.

In other words, if the transmission end of data receives the NACK signal, it re-transmits the frame every fourth time unit until receiving the ACK signal.

In the meantime, the asynchronous HARQ scheme is performed by the newly-scheduled retransmission timing and the additional signal transmission. In other words, a timing point at which the previously-failed frame is re-transmitted is variable with a variety of factors such as a channel status.

The HARQ scheme can be classified into a channel-adaptive HARQ scheme and a channel-non-adaptive scheme according to information indicating whether a channel status is reflected in allocation of resources used for retransmission.

The channel-non-adaptive HARQ scheme (also called a non-adaptive HARQ scheme) enables resource blocks used for retransmission, and a MCS (Modulation and Coding Scheme) level defining frame modulation and coding methods to be operated according to a specific scheme predetermined by initial transmission.

The channel-adaptive scheme (also called an adaptive HARQ scheme) allows the above-mentioned resource blocks and the MCS level to be variable with channels status information.

For example, according to the channel-non-adaptive HARQ scheme, a transmission end transmits data using eight resource blocks during the initial transmission, and then re-transmits the data using the same eight resource blocks irrespective of a channel status acquired by retransmission of the data.

On the other hand, according to the channel-adaptive HARQ scheme, although data is initially transmitted using 8 resource blocks, the data may also be re-transmitted using eight or less resource blocks or eight or more resource blocks according to the next channel status as necessary.

According to the above-mentioned classification, the HARQ scheme may have four combinations of the HARQ schemes. According to unique characteristics of the above-mentioned schemes, the most preferred combinations of the HARQ schemes are an asynchronous channel-adaptive HARQ scheme, and a synchronous channel-non-adaptive scheme.

Generally, the asynchronous channel-adaptive HARQ scheme adaptively changes a retransmission timing point and the amount of used resources to others according to a channel status, so that it can maximize the retransmission efficiency. In the meantime, the synchronous channel-non-adaptive HARQ scheme has an advantage in that there is almost no overhead because the retransmission timing and the resource allocation for retransmission are pre-engaged in a system.

DISCLOSURE

Technical Problem

However, the above-mentioned asynchronous channel-adaptive HARQ scheme has a disadvantage in that it unavoidably increases an amount of overhead, so that it is not generally considered for an uplink. And if the synchronous channel-non-adaptive HARQ scheme is used under an excessively-changing channel status, retransmission efficiency is excessively decreased.

Technical Solution

Accordingly, the present invention is directed to a retransmission method for use in a multi-carrier system that substantially obviates one or more problems due to limitations and disadvantages of the related art.

An object of the present invention is to provide a retransmission method in a multi-carrier system.

Another object of the present invention is to provide a method for indicating a retransmission request via an uplink scheduling message in a multi-carrier system.

Another object of the present invention is to provide a method for determining whether there is an erroneous or faulty in an ACK/NACK signal at a reception end of the ACK/NACK signal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a retransmission method for a multi-carrier system comprising: receiving a grant message including scheduling information for transmitting uplink data wherein a retransmission scheme for the uplink data is predetermined by a first retransmission scheduling, transmitting the uplink data according to the scheduling information, and retransmitting the uplink data according to second retransmission scheduling by receiving the second retransmission scheduling information associated with the uplink data with retransmission request.

The second retransmission scheduling information may include changed information of at least one of a retransmission timing, retransmission resource blocks, a number of the retransmission resource blocks, and a transmission format of retransmission the second retransmission scheduling information with comparing with the first retransmission scheduling.

In another aspect of the present invention, there is provided a retransmission method for a multi-carrier system comprising: receiving a grant message including scheduling information for transmitting uplink data, transmitting the uplink data according to the scheduling information, receiving a grant message indicating a retransmission of the uplink data, and retransmitting the uplink data.

The grant message may include information indicating one of new data transmission and retransmission.

The information indicating one of the new data transmission and the retransmission may apply a toggling scheme to change a current value of the information to another value if the new data transmission is indicated.

The information indicating one of the new data transmission and the retransmission may be initialized if the new data transmission is indicated, or be changed according to a predetermined rule if the retransmission is indicated.

If a retransmission scheme for the uplink data is predetermined by a first retransmission scheduling and the grant message indicating the retransmission includes second retransmission scheduling information, the retransmission may be performed according to the second retransmission scheduling information.

In yet another aspect of the present invention, there is provided a retransmission method for a multi-carrier system comprising: transmitting data, receiving an acknowledgement signal of the data; and determining whether an error occurs in the acknowledgement signal by referring to a scheduling message received after the acknowledgement signal.

The method may further comprise: maintaining the data in a buffer even when the received acknowledgement signal is an affirmative acknowledgement (ACK) signal.

Provided that the acknowledgement signal is the affirmative acknowledgement (ACK) signal, if the scheduling message indicates new data transmission, it may be determined that the acknowledgement signal has no error; and if the scheduling message indicates retransmission, it may be determined that the acknowledgement signal has an error.

In yet another aspect of the present invention, there is provided a retransmission method for a multi-carrier system comprising: transmitting data, receiving an acknowledgement signal of the data, and maintaining the data in a buffer until receiving a scheduling message.

The method may further comprise: if the scheduling message indicates a new data transmission, deleting the data from the buffer, and transmitting new data; and if the scheduling message indicates a retransmission, retransmitting the data.

The acknowledgement signal may be at least one of an affirmative acknowledgement signal, a stop message, and a grant message.

The grant message may include information indicating that there is no resource block allocated for the data retransmission.

The acknowledgement signal may be transmitted to interrupt the retransmission if resources for retransmission data cannot be allocated at a predetermined retransmission timing of the data.

The data may not be retransmitted at the predetermined retransmission timing, and is then retransmitted at the next retransmission timing.

It is to be understood that both the foregoing general description and the following detailed description of the present invention are exemplary and explanatory and are intended to provide further explanation of the invention as claimed.

Advantageous Effects

If the retransmission method for the multi-carrier system is based on a channel-non-adaptive retransmission scheme, the present invention can flexibly or smoothly schedule retransmission resources.

If the retransmission method for the multi-carrier system is based on a synchronous retransmission scheme, the present invention can flexibly or smoothly schedule the retransmission timing point.

Also, the present invention can more effectively perform the synchronous channel-non-adaptive HARQ scheme.

The present invention can properly cope with the ACK/NACK errors, so that a communication performance increases.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

For the convenience of description and better understanding of the present invention, general structures and devices well known in the art will be omitted or be denoted by a block diagram or a flow chart. Wherever possible, the same reference numbers will be used throughout the drawings to refer to the same or like parts.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another Some components or characteristics of any embodiment may also be included in other embodiments, or may be replaced with those of the other embodiments as necessary.

The following embodiments of the present invention will be disclosed on the basis of a data communication relationship between the Node-B and the user equipment (UE). In this case, the Node-B is used as a terminal node of a network via which the Node-B can directly communicate with the user equipment (UE).

Specific operations to be operated by the Node-B in the present invention may also be operated by an upper node of the Node-B as necessary. In other words, it will be obvious to those skilled in the art that various operations for enabling the Node-B to communicate with the user equipment (UE) in a network composed of several network nodes including the Node-B will be operated by the Node-B or other network nodes other than the Node-B.

The term "Node-B" may be replaced with a fixed station, eNode-B (eNB), or an access point as necessary. The user equipment (UE) may also be replaced with a mobile station (MS) or a mobile subscriber station (MSS) as necessary.

Figure 1:
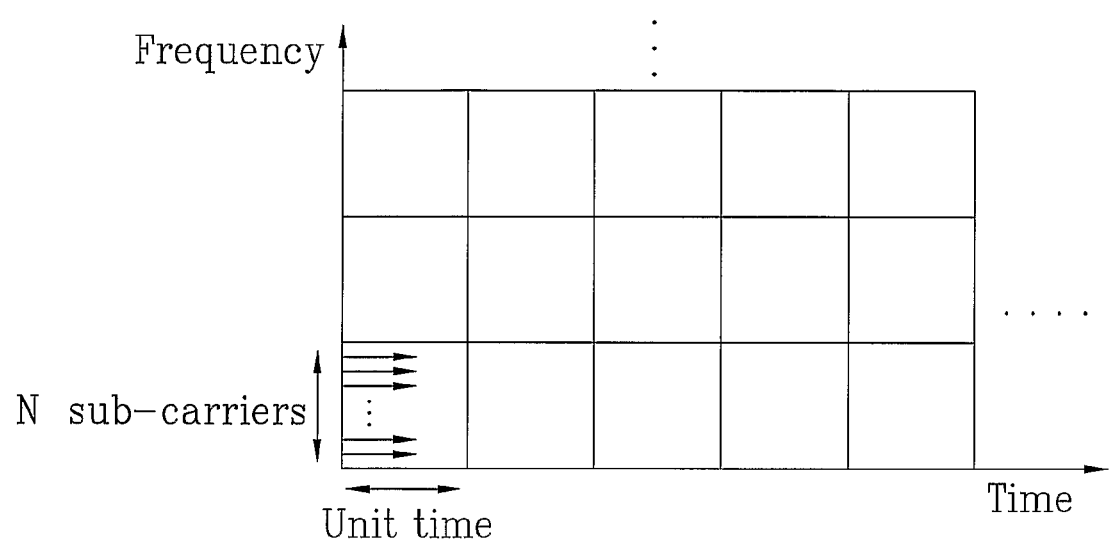
FIG. 1 is a conceptual diagram illustrating a time-frequency resource block used for the scheduling of a multi-carrier system.
Figure 2:
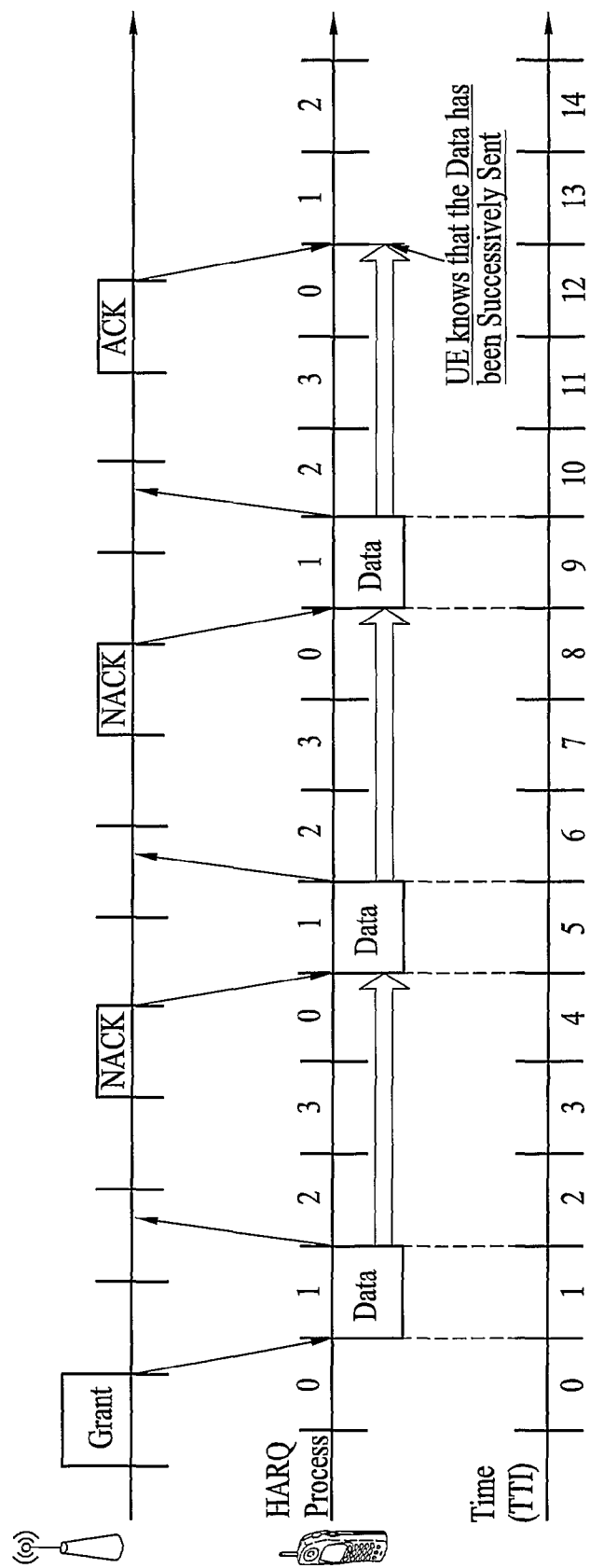
FIG. 2 is a conceptual diagram illustrating a general synchronous channel-non-adaptive HARQ scheme capable of being applied to an uplink transmission.

FIG. 2 is a conceptual diagram illustrating a general synchronous channel-non-adaptive HARQ scheme capable of being applied to an uplink transmission.

In the case of an uplink transmission, if the Node-B has a UE, which will transmit data to implement the UE's initial transmission, the Node-B informs the UE of wireless resource information and timing information to be used for the UE's data transmission, so that it generally transmits a scheduling message for allowing the UE's data transmission to the UE. The above-mentioned scheduling message for allowing the UE's data transmission and informing scheduling information is hereinafter referred to as a grant message.

The UE receives the grant message, acquires scheduling information, and transmits data to the Node-B according to the acquired scheduling information.

In association with the transmitted (Tx) data, the UE normally receives acknowledgment signal of the Tx data from the Node-B, so that it may receive the ACK signal from the Node-B or may also receive the NACK signal requesting transmission of the data from the Node-B. If the UE receives the ACK signal, it deletes the Tx data from a buffer, and waits for a transmission of new data. If the UE receives the NACK signal, it may retransmit the Tx data according to a retransmission scheme.

In the case of data retransmission of a specific UE, which has transmitted data to an uplink at a specific time according to the synchronous channel-non-adaptive HARQ scheme, the retransmission timing is pre-engaged in a system. The resource block to be used for the retransmission and the transmission format are equal to those of the previous transmission.

Therefore, it is sufficient that the grant message transmitted once from the Node-B should be transmitted to the UE for the initial transmission. The next retransmission may be operated by the ACK/NACK signal indicating whether data has been retransmitted or not without further informing retransmission timing information and resource blocks to be used for the retransmission.

In the case of the synchronous channel-non-adaptive HARQ scheme, data retransmission can be operated by transmission/reception of the NACK signal without using additional scheduling information between the Node-B and the UE. In other words, if the UE receives the NACK signal from the Node-B while maintaining the initially-transmitted data in its own buffer, the UE can retransmit data using the same frequency resources and MCS (Modulation and Coding Scheme) information as those of the initial transmission at a retransmission timing point having been predetermined before the retransmission.

However, in the case of maintaining characteristics of the above-mentioned synchronous channel-non-adaptive HARQ scheme, a collision between the transmitted (Tx) data units may occur. In more detail, if the retransmission is operated by the synchronous channel-non-adaptive HARQ scheme, situation like that urgent data, high-priority control signals, or persistent scheduling data should be transmitted at predetermined retransmission timing using predetermined retransmission resources can be occurred. In this case, if the UE, which will retransmit data using the synchronous channel-non-adaptive HARQ scheme, retransmits the data using a corresponding resource at a pre-engaged timing point, a collision between Tx data units of different UEs may occur.

Figure 3:
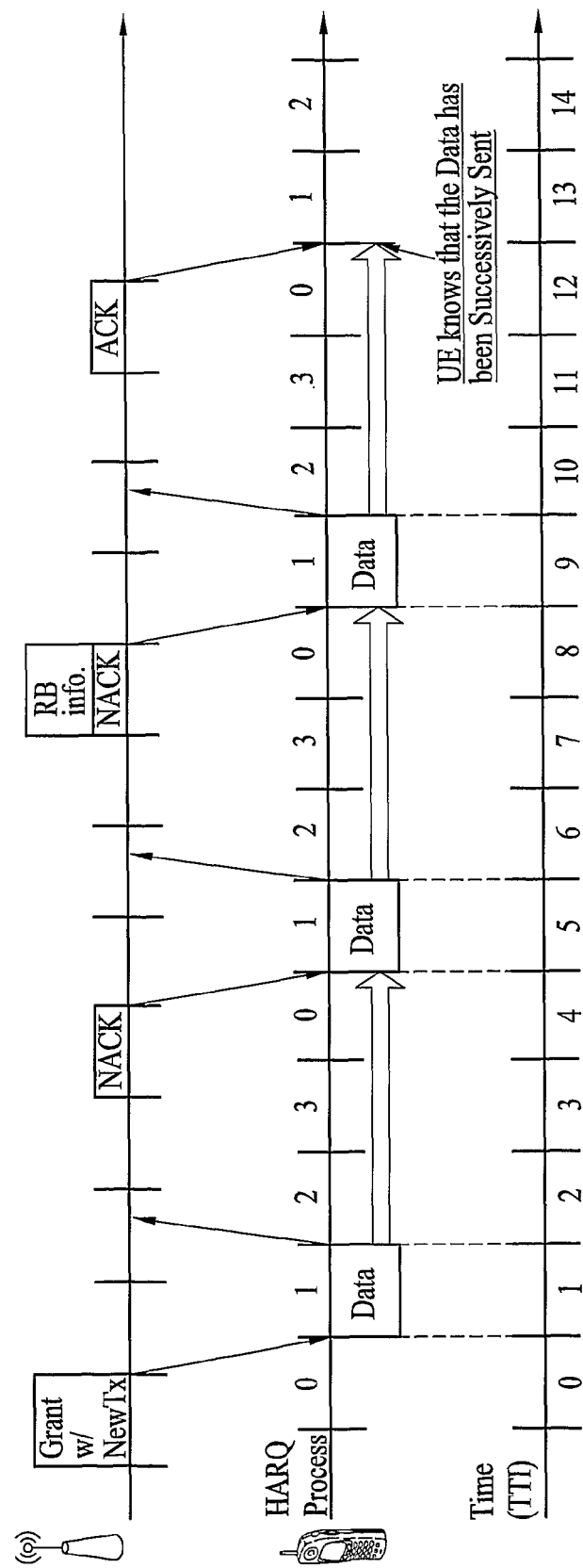
FIG. 3 is a conceptual diagram illustrating a retransmission method for use in a multi-carrier system according to an embodiment of the present invention.

FIG. 3 is a conceptual diagram illustrating a retransmission method for use in a multi-carrier system according to an embodiment of the present invention.

According to the embodiment of FIG. 3, the predetermined retransmission scheduling can be changed in the synchronous channel-non-adaptive HARQ scheme based multi-carrier system, and retransmission can be operated according to the result of the changed retransmission scheduling.

For the convenience of description, it is assumed that the UE retransmits data via a second HARQ process in a 4-channel HARQ system, a first data is transmitted at TTI=1, and the data cannot be retransmitted at TTI=9 which is a predetermined retransmission timing according to the synchronous channel-non-adaptive HARQ scheme.

In this case, four HARQ processes having different retransmission timing points are defined in the 4-channel HARQ system, so that the 4-channel HARQ system allows the individual HARQ processes to perform the retransmission process during the same interval.

The aforementioned four HARQ processes are shown as index 0~index 3 respectively, in the center part of FIG. 3. That is, the index 0~index 3 in the center part of FIG. 3 is indicative of discriminating retransmission timing information of the UE employing the first HARQ process~the fourth HARQ process, respectively.

For example, the UE scheduled to retransmit data by the second HARQ process retransmits corresponding data at a timing of the first HARQ process. In other words, the UE can retransmit the data at TTI=1, TTI=5, and TTI=9.

The Node-B transmits a grant message including scheduling information to the uplink-scheduled UE. In this case, the scheduling information informs a scheduled frequency band at a scheduled Tx time the uplink-scheduled UE to transmit uplink data. If the UE receives the grant message, the UE transmits data according to the scheduling information at the timing TTI=1.

The grant message may include a UE identifier (ID) for identifying a corresponding UE, resource block (RB) allocation information, information of transmittable data, payload information, and transmission scheme information such as MCS (Modulation and Coding Scheme) information.

The RB allocation information may be set to the number of RBs to be used by the above-mentioned UE, and/or the location information of the RBs. The above-mentioned transmittable data information may be set to the size of data capable of being transmitted from the UE receiving the grant message. The above-mentioned payload indicates a packet or frame part containing message data, differently from a header part of a general communication system.

If the incremental redundancy (IR) HARQ scheme is also used as the retransmission scheme, the grant message may further include the above-mentioned IR version information for data retransmission. The IR HARQ scheme from among various HARQ schemes performs channel encoding of information data to improve a data reception (Rx) performance, and transmits different coding bits whenever the retransmission is operated.

The IR version information is associated with the number of retransmission times of the synchronous HARQ scheme, so that the transmission/reception end can tacitly recognize the IR version information. That is, in the case of using the synchronous HARQ scheme, the first IR version is used for a first transmission, a second IR version is used for a second retransmission, and a third IR version is used for a third retransmission, so that the number of retransmission times can be recognized by the IR version information.

The Node-B receives data from the UE at the timing TTI=1, and determines whether retransmission of the data is required or not. If the data retransmission is no longer required, the Node-B transmits the ACK signal to the UE. Otherwise, if the data retransmission is required, the Node-B transmits the NACK signal to the UE.

Referring to FIG. 3, the Node-B transmits the NACK signal. It is assumed that the synchronous channel-non-adaptive HARQ scheme is used, so that a reception (Rx) UE can perform data retransmission although the Node-B does not transmit additional retransmission scheduling information when transmitting the NACK signal.

If the UE receives the NACK signal from the Node-B, it retransmits the data, which has been transmitted at the timing TTI=1, according to the second HARQ process at the timing TTI=5. In this case, as previously stated above, the UE retransmits data using resource blocks which have the same size and location information as those of the previous resource blocks used for the first transmission.

The Node-B receiving the retransmitted (ReTx) data determines whether retransmission of the ReTx data is also required or not. As can be seen from FIG. 3, the Node-B transmits the NACK signal to the above-mentioned ReTx data.

In this case, the base station according to the above-mentioned embodiment may change the retransmission scheduling to another. If the Node-B transmits the NACK signal to the UE so as to request retransmission of data, the Node-B performs scheduling so that the data can be retransmitted using other transmission blocks during the retransmission according to the scheduling information. Then, the Node-B informs the UE of the changed scheduling information.

In brief, the synchronous channel-non-adaptive HARQ scheme is basically maintained, however, the retransmission timing information, the RB used for the retransmission, or the transmission scheme is changed to another, so that the system flexibility increases.

If the retransmission scheduling is changed to another according to the above-mentioned embodiment, the Node-B informs the UE of the changed scheduling information. The UE receives the NACK signal and the changed scheduling information from the Node-B, so that it will retransmit data according to the newly-received changed scheduling information, instead of the predetermined retransmission scheme.

According to this embodiment of the present invention, although data transmission is operated by the synchronous channel-non-adaptive HARQ scheme, the RB size and location information, the retransmission timing information, or the transmission scheme can be adaptively changed to others.

A method for retransmitting data by changing the RB used for the retransmission will hereinafter be described.

In FIG. 3, provided that the UE transmits data using the A resource block during the initial transmission and the first retransmission, the Node-B performs scheduling so that the data can be transmitted using the B resource block, instead of the A resource block, at the second retransmission timing according to the scheduling information. And, the Node-B informs the UE of information of the B resource block, so that the UE can transmit data using the B resource block at the second retransmission timing.

Therefore, in this case, differently from the typical synchronous channel-non-adaptive HARQ scheme designed to transmit the NACK signal without any retransmission scheduling information, the Node-B transmits retransmission scheduling information of the changed resource block(s) to the UE, so that the UE performs data retransmission over the B resource block.

A variety of methods may be used to transmit the changed scheduling information. A message format capable of transmitting the changed scheduling information is newly defined, so that data can be transmitted over a control channel. Also, a conventional message format may be extended or modified as necessary, so that the convenience message format may also be used to transmit the changed scheduling information. For example, the change scheduling information may be transmitted over the above-mentioned grant message.

In the case of using the above-mentioned embodiment, if the Node-B must transmit data to another UE via the retransmission timing and the corresponding resource block (RB), or must transmit other data of the corresponding UE, the collision problem between Tx data units can be solved.

Figure 4:
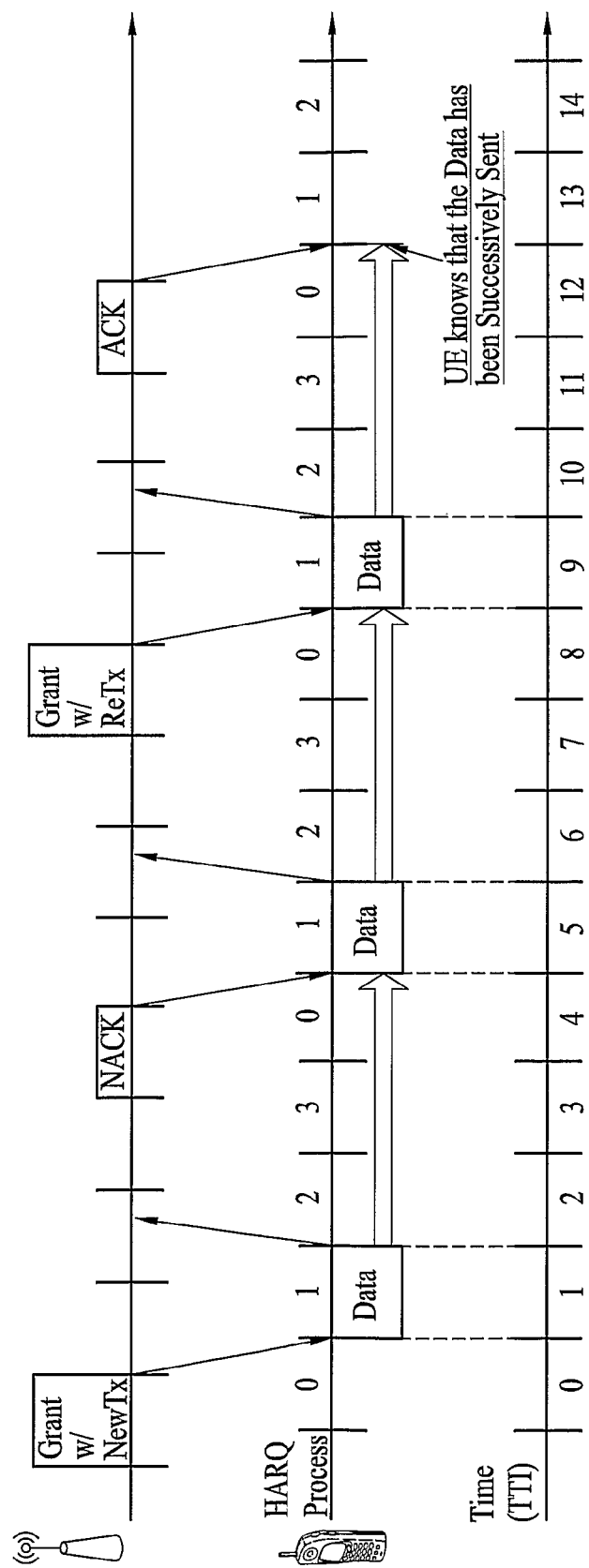
FIG. 4 is a conceptual diagram illustrating a retransmission method for use in a multi-carrier system according to another embodiment of the present invention.

FIG. 4 is a conceptual diagram illustrating a retransmission method for use in a multi-carrier system according to the present invention.

FIG. 4 shows a method for indicating whether data is retransmitted using a scheduling message (e.g., a grant message) on the condition of uplink data transmission.

In this way, in the case where the Node-B transmits information of the changed resource block using the scheduling message, the scheduling message for the retransmission includes specific information corresponding to the NACK signal, so that there is no need to additionally transmit the NACK signal. According to the above-mentioned embodiment of FIG. 4, it will be obvious to those skilled in the art that the embodiment of FIG. 3 can also be applied to the embodiment of FIG. 4 as necessary.

Similar to the embodiment of FIG. 3, the embodiment of FIG. 4 also assumes that the UE retransmits data via the second HARQ process in the 4-channel HARQ system, a first data is transmitted at TTI-1, and the data cannot be retransmitted at TTI-9 in the synchronous channel-non-adaptive HARQ scheme based multi-carrier system.

According to the above-mentioned embodiment of FIG. 4, the Node-B may transmit a grant message instead of the NACK signal. Although FIG. 4 shows a method for indicating a reception acknowledgement using both the ACK/NACK signal and the grant message, the grant message instead of the ACK/NACK signal of FIG. 4 can be transmitted, so that the grant message can replace the ACK/NACK signal function.

Although the synchronous channel-non-adaptive HARQ scheme is applied to the embodiment of FIG. 4 in the same manner as in FIG. 3, data retransmission can be operated on the basis of the changed scheduling information. Specifically, the changed scheduling information is transmitted via the grant message according to the embodiment of FIG. 4, so that the embodiment of FIG. 4 can be more easily implemented.

If the Node-B informs the UE of the changed scheduling information via the grant message, the MCS and information associated with other transmission schemes transmittable by the grant message can be transmitted in the same manner as in the initial transmission. Needless to say, the RB location, the number of used RBs, and the MCS level may be changed and transmitted. In this case, the MCS level is pre-defined between the Node-B and the UE according to the payload size of Tx data and the number of RBs.

In this way, in order to request the UE to retransmit data using the grant message, it is preferable that the grant message transmitted from the Node-B may indicate whether new data transmission is requested or retransmission is requested.

An exemplary method for allowing the UE to recognize which one of the new data transmission and the retransmission is requested by the Node-B will hereinafter be described in detail.

Figure 5:
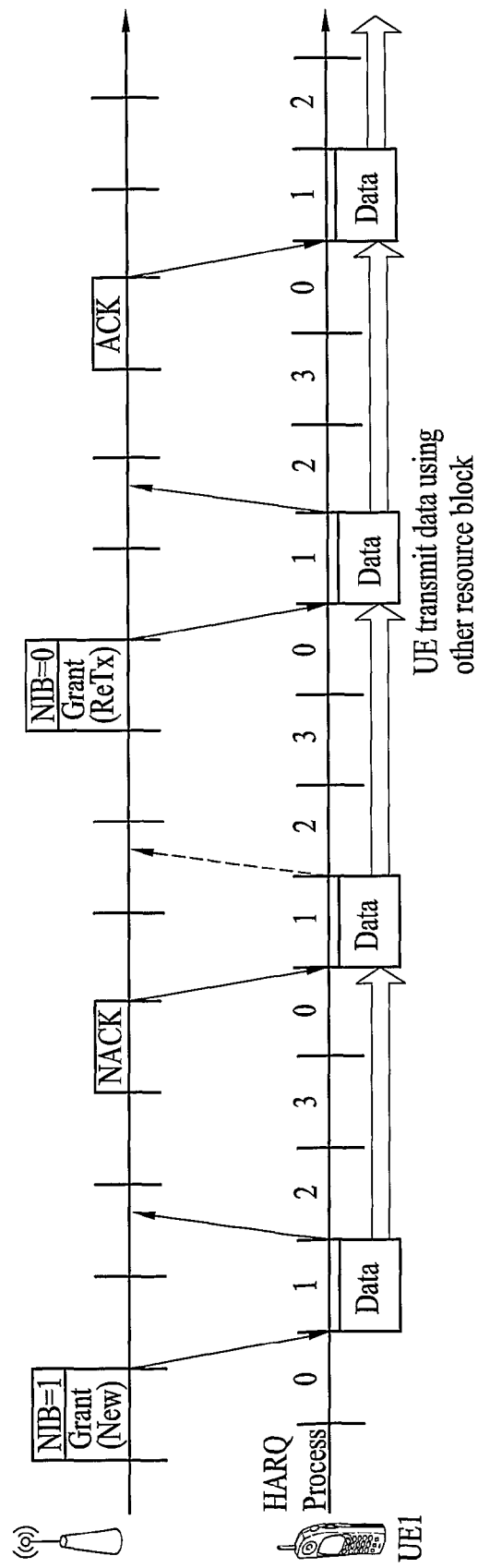
FIG. 5 is a conceptual diagram illustrating a method for informing that a grant message indicating which one of new data transmission and retransmission is requested in case that the grant message is used for requesting retransmission according to another embodiment of the present invention.

FIG. 5 is a conceptual diagram illustrating a method for informing that a grant message indicating which one of new data transmission and retransmission is requested in case that the grant message is used for requesting retransmission according to another embodiment of the present invention.

The embodiment of FIG. 5 adds an information bit composed of one or more bits as transmission type indication information, and indicates which one of the new data transmission and the retransmission is requested by the grant message using the added information bit. According to the present invention, the transmission type indication information is referred to as an NIB (New data Indicator Bit) composed of 1 bit.

For example, if the grant message indicates the new data transmission as shown in FIG. 5, the NIB is set to "0", and then the grant message is transmitted with the NIB of "0". If the grant message indicates the retransmission as shown in FIG. 5, the NIB is set to "1", and then the grant message is transmitted with the NIB of "1". In other words, the UE receiving the grant message checks the NIB value, so that it can determine which one of the new data transmission and the retransmission is indicated by the grant message on the basis of the checked NIB value.

In the meantime, an unexpected error occurs in reception of the grant message indicating the new data transmission, so that the UE may be unable to recognize which one of the new data transmission and the retransmission is indicated by the following grant message indicating the retransmission.

For example, although the Node-B transmits the grant message indicating the retransmission to the UE, the UE erroneously decodes the NACK signal of the previous Tx timing, so that it is unable to recognize whether the Node-B has transmitted the first grant message indicating the retransmission or has erroneously received the second grant message indicating the new data transmission.

A variety of retransmission methods in which the reception error of the grant message is considered will hereinafter be described in detail.

Figure 6:
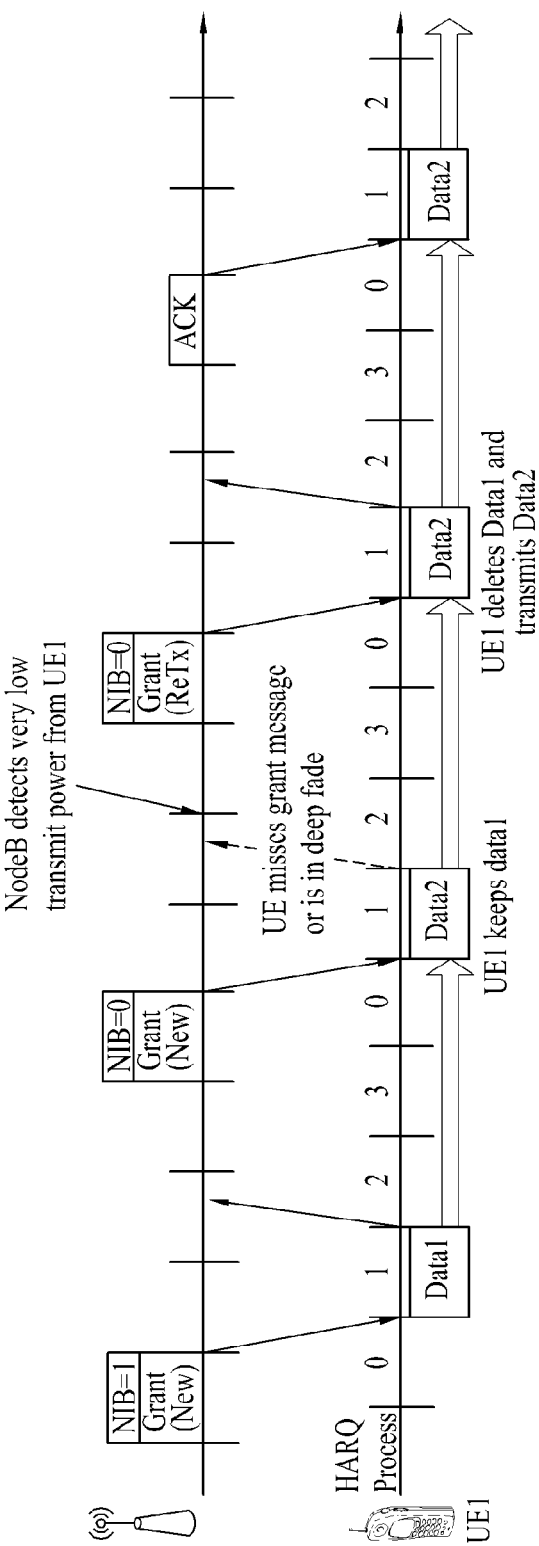
FIG. 6 is a conceptual diagram illustrating another method for informing that a grant message indicating which one of new data transmission and retransmission is requested in case that the grant message is used for requesting retransmission according to another embodiment of the present invention.

FIG. 6 is a conceptual diagram illustrating a method for informing that a grant message indicating which one of new data transmission and retransmission is requested in case that the grant message is used for requesting retransmission according to another embodiment of the present invention.

The embodiment of FIG. 6 includes transmission type indication information, and indicates which one of the new data transmission and the retransmission is requested by the grant message using the transmission type indication information. In this case, the toggling scheme for changing the value in a predetermined case is applied the transmission type indication information. As a result, the embodiment of FIG. 6 prepares against the reception error of the grant message. In FIG. 6, the transmission type indication information is also called "NIB" (New data Indicator Bit), and it is assumed that the NIB is composed of 1 bit.

For example, if the grant message indicates the new data transmission as shown in FIG. 6, the NIB value may be changed to another value. The NIB value is set to "1" (i.e., NIB=1) as a grant message for indicating the new data transmission to specific data "Data1".

Then, if the grant message indicates the new data transmission to another data "Data2", the NIB value is toggled to set to "0" (i.e., NIB-0) by the toggling scheme.

In the case where the grant message indicating the retransmission is applied to the UE at the next retransmission timing, the value of NIB=0 remains unchanged, so that the UE can recognize the occurrence of the retransmission to the data "data2". In other words, the NIB value is changed only when the grant message indicating the new data transmission.

The UE receives the grant message, and determines whether the NIB value of the received grant message is different from another NIB value received in a previous HARQ process. If the NIB value of the received grant message is different from the other NIB value received in the previous HARQ process, this means that the grant message indicates the new data transmission, so that the UE deletes all of data from the buffer and transmits new data packet.

And, if the NIB value of the grant message received in the UE is equal to the other NIB value received in the previous HARQ process, this means that the grant message indicates the retransmission, so that the UE retransmits the data packet stored in the buffer.

As can be seen from FIG. 6, the UE may unexpectedly miss the grant message indicating the new data transmission. If a channel is in a deep fading status, the Node-B may detect only energy of a very low level. In this case, the Node-B transmits the grant message indicating the retransmission.

If the Node-B transmits the grant message according to the embodiment of FIG. 5, and the UE misses the grant message, the above-mentioned UE may retransmit data to another data "Data1" instead of "Data2". However, if the toggling scheme is applied to the NIB value according to the present invention, the above-mentioned problem can be solved.

For example, if the UE receives the first grant message indicating transmission of "Data2", the UE compares the NIB value of the grant message indicating the retransmission of "data2" with the NIB value of the previous grant message, confirms that the two NIB values are equal to each other, and performs retransmission of "data2" stored in the buffer.

If the UE does not receive the initial grant message indicating the transmission of "data2", the UE compares the NIB value of the grant message indicating retransmission of "data2" with the other NIB value of a previous grant message, confirms that there is a difference between the two NIB values, deletes "data1" stored in the buffer, and begins to perform initial transmission of "data2". Namely, from the viewpoint of the UE, the above-mentioned operation is considered to be the initial transmission, however, from the viewpoint of the Node-B, the above-mentioned operation is considered to be reception of retransmission data.

Figure 7:
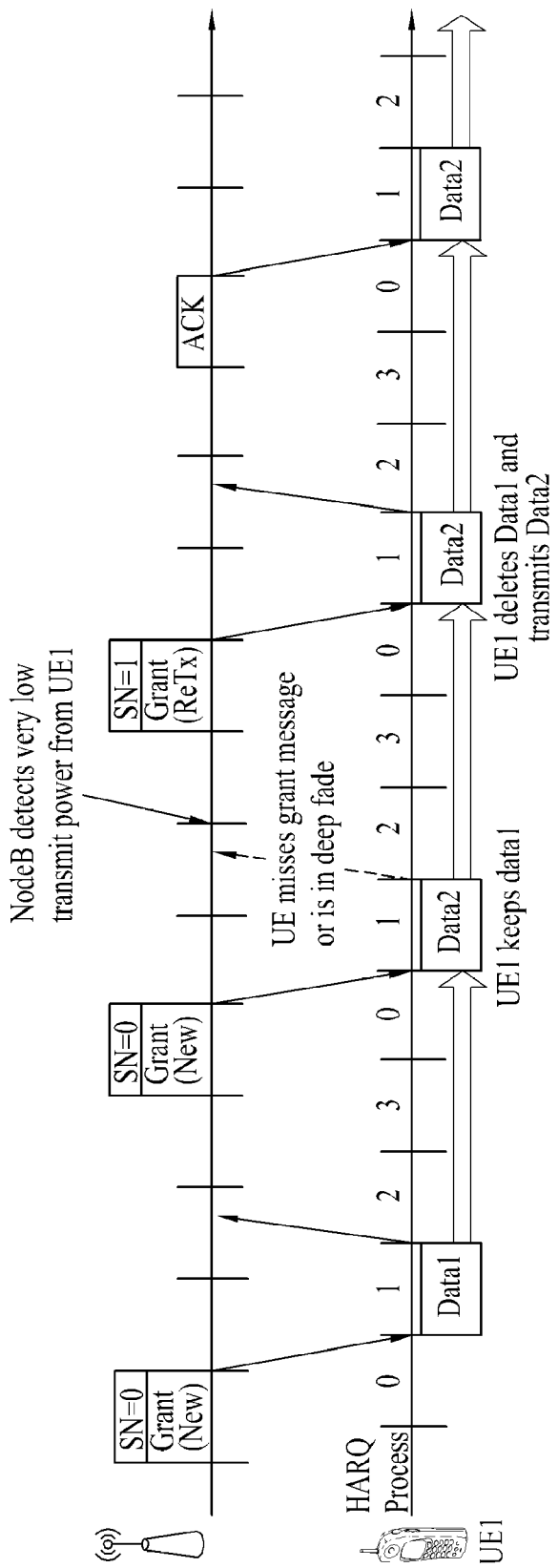
FIG. 7 is a conceptual diagram illustrating another method for informing that a grant message indicating which one of new data transmission and retransmission is requested in case that the grant message is used for requesting retransmission according to another embodiment of the present invention.

FIG. 7 is a conceptual diagram illustrating a method for informing that a grant message indicating which one of new data transmission and retransmission is requested in case that the grant message is used for requesting retransmission according to another embodiment of the present invention.

The embodiment of FIG. 7 adds an information bit composed of one or more bits as sequence number information, and indicates which one of the new data transmission and the retransmission is requested by the grant message using the added information bit. According to the present invention, the sequence number information is referred to as a sequence number (SN).

If the SN is added to the grant message and then the UE receives the resultant grant message including the SN, the UE can recognize which one of the new data transmission and the retransmission is requested by the grant message, and can also recognize what one of data is retransmission-requested for by the grant message. A method for establishing the SN value according to the present invention is as follows.

The SN information is transmitted along with the grant message, or is contained in the grant message and is then transmitted, without distinguishing between the new data transmission and the retransmission. Whenever the Node-B receives a retransmission request of the same data packet, the SN value increases by "1". If the new data transmission is requested, the SN value is initialized to be an initial value.

For example, it is assumed that the SN initial value is set to "0". In other words, in the case of transmitting the grant message indicating the new data transmission, the SN value is set to "0". Therefore, if the SN value transmitted along with the grant message is not equal to the value of "0", the UE can recognize that the above-mentioned grant message indicates the retransmission.

Referring to FIG. 7, if the UE receives the grant message and the SN value of the received grant message is equal to "2", the UE performs retransmission of the initially-transmitted data before 8 sub-frames denoted by (2(SN)*4 (HARQ channel)=8).

However, provided that the SN value is not equal to "0" at a time at which the grant message is received, and at the same time is not equal to the other SN value, which should be received in association with current retransmitting data, i.e., provided that the just-before grant message is missed, the UE deletes all of data stored in the buffer without retransmitting data of the previously-received grant message, and begins to perform the initial transmission of new data.

In more detail, as can be seen from FIG. 7, if the UE misses or loses the grant message indicating the initial transmission of "data2", or if the UE detects energy of a very low level due to a deep-fading channel although data has been transmitted, the Node-B transmits a message indicating the retransmission along with the signal of SN=1.

In this case, if the UE has not missed the previous grant message, it can be recognized that the SN value, which should be received in association with the current retransmission data, is not equal to "2". Therefore, since the SN=0 status is not established, the UE deletes all of data associated with "data1" from the buffer and performs retransmission of "data2", instead of performing retransmission of "data1"

The "data2" instantaneous transmission operated by the UE may be considered to be the retransmission request from the viewpoint of the Node-B. However, if the UE has previously missed the grant message indicating the initial transmission of "data2", this means that the initial transmission of "data2" is operated from the viewpoint of the UE. As a result, the UE may not wrongly recognize the retransmission data packet.

Figure 8:
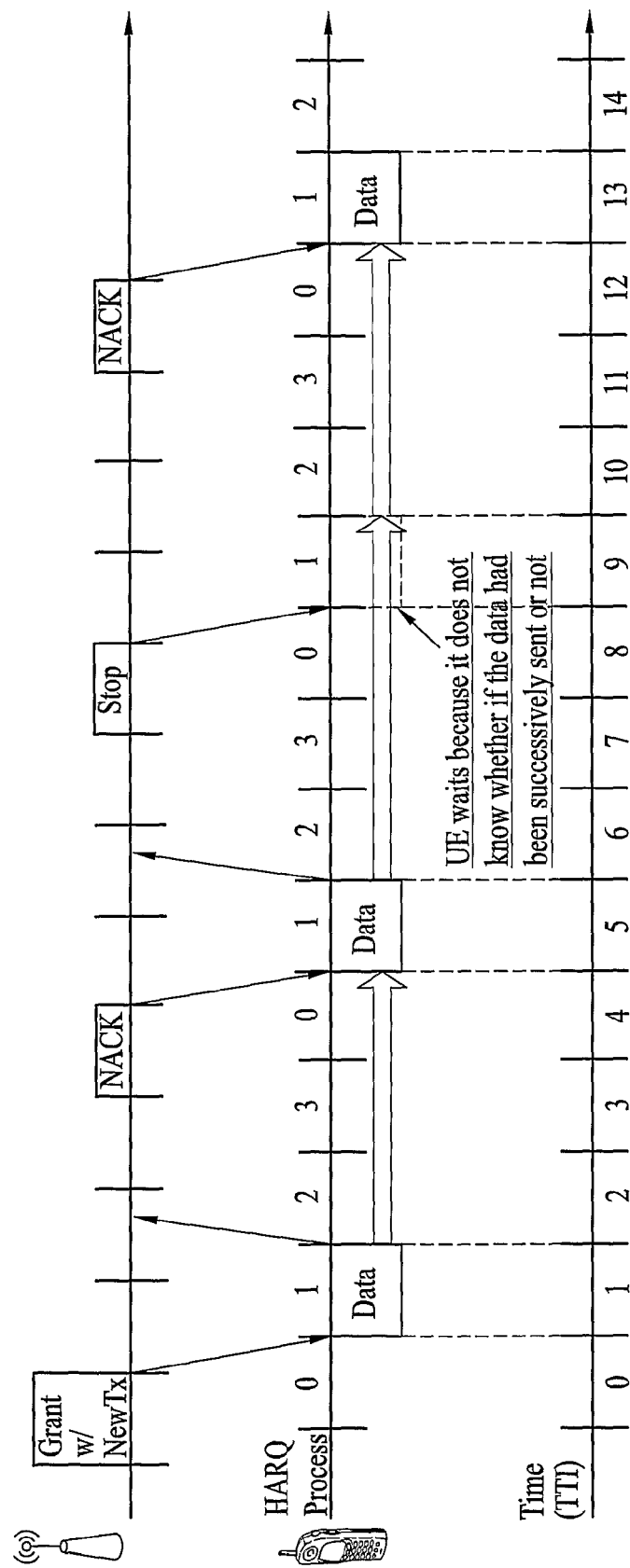
FIG. 8 is a conceptual diagram illustrating a method for indicating a retransmission stop according to an embodiment of the present invention.

FIG. 8 is a conceptual diagram illustrating a method for indicating a retransmission stop according to an embodiment of the present invention.

The embodiment of FIG. 8 assumes that the synchronous channel-non-adaptive HARQ scheme and the second HARQ process are used in the same manner as in FIGS. 3 and 4.

In order to request the UE to stop the retransmission, the Node-B may exemplarily use a stop message, and a detailed description thereof will hereinafter be described.

Referring to FIG. 8, the Node-B transmits the grant message to the UE, so that it requests the UE to transmit data. The UE checks the received grant message, and performs uplink data transmission at the timing TTI=1.

The Node-B checks the data transmitted from the UE. If retransmission of the data is required, the Node-B transmits the NACK signal to the UE. Upon receiving the NACK signal from the Node-B, the UE performs retransmission of the data at a predetermined timing according to the synchronous channel-non-adaptive HARQ scheme at TTI=5.

According to this embodiment of the present invention, the Node-B transmits the stop message to the UE, so that it may stop the UE's retransmission at the next retransmission timing based on the synchronous non-adaptive HARQ scheme. The UE receiving the stop message does not perform retransmission at a predetermined timing TTI=9, does not delete data, having been transmitted at a previous timing, from the buffer, and keeps the above-mentioned data in the buffer. The UE receiving the stop message does not perform retransmission for a predetermined time, and does not delete data from the buffer. In this case, the predetermined time may be equal to two times the establish retransmission interval, or may be set to a time consumed until the UE receives specific information indicating either the new data transmission or the retransmission from the Node-B.

Another method for requesting the UE to stop the retransmission may be a method for employing the above-mentioned grant message.

The Node-B transmits information indicating no allocation RB to the UE via the grant message, so that it may request the UE to stop the retransmission in the synchronous channel-non-adaptive HARQ system. For example, when transmitting the number of RBs contained in the grant message or the RB size information contained in the same grant message, the Node-B may include information of "0" in the transmitted information.

If the Node-B stops the retransmission at the UE's reserved retransmission timing, then the Node-B may request retransmission via the same HARQ process as that of the initial transmission. The Node-B re-allocates resource blocks (RBs) at the next retransmission timing corresponding to the same HARQ process, and transmits the RB information via the grant message indicating the retransmission, so that retransmission of corresponding data can be restated.

Thereafter, the Node-B transmits the NACK signal requesting the retransmission to the UE, so that the UE retransmits the previously-transmitted data stored in the buffer at the next retransmission timing point TTI=13.

In the meantime, if the UE receiving the stop message may receive the ACK signal from the Node-B within a predetermined time, or may not receive the ACK signal within the predetermined time, it deletes data stored in the buffer, and may be ready to transmit new data.

In this case, if there is no resource block to be allocated for the retransmission at the reserved retransmission because of other data transmitting, the UE stops the retransmission for a little while, so that the retransmission can be more flexibly scheduled.

Figure 9:
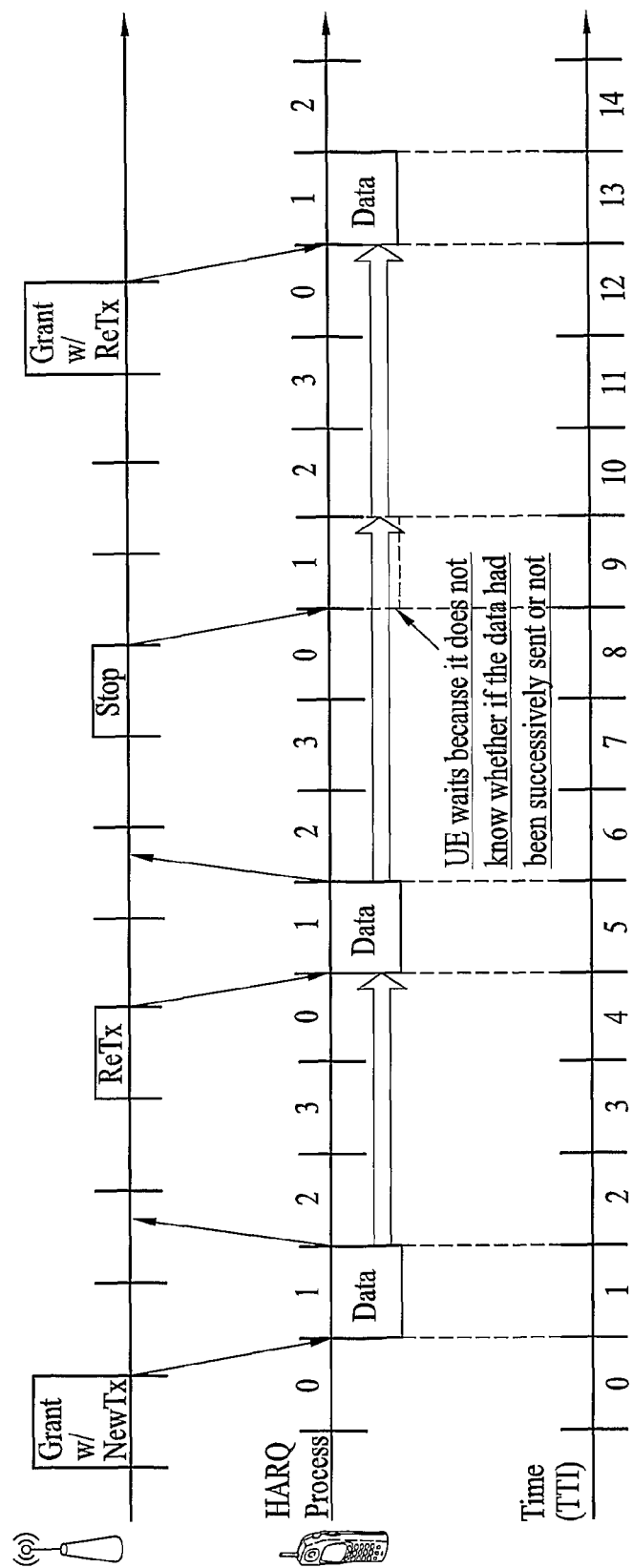
FIG. 9 is a conceptual diagram illustrating a method for indicating a retransmission according to an embodiment of the present invention.

FIG. 9 is a conceptual diagram illustrating a method for indicating a retransmission according to an embodiment of the present invention.

The embodiment of FIG. 9 discloses a method for performing the retransmission using a retransmission message. In this case of the embodiment of FIG. 9 it assumed that the synchronous non-adaptive HARQ scheme is basically applied to the above-mentioned method, and the second HARQ process is also applied to the above-mentioned method, so that the resultant data is retransmitted at a corresponding timing.

Differently from the above-mentioned embodiments, the embodiment of FIG. 9 allows the Node-B to use a retransmission (ReTx) message to indicate the retransmission, and allows the Node-B to use the stop message to stop the retransmission in such a way that the retransmission process is operated. The ReTx message and the stop message are not limited to the above-mentioned terms, and can also be replaced with other terms as necessary.

The stop message of FIG. 9 is designed to perform the same function as the stop message of FIG. 8. The stop message of FIG. 9 does not retransmit the previously-transmitted data, however, it requests the UE to maintain data in the buffer.

The Node-B transmits a grant message for the new data transmission to the selected UE. The UE checks the grant message, and performs uplink transmission at TTI=1. If the Node-B checks data transmitted from the UE and determines the necessity of retransmission, and transmits the ReTx message for requesting the retransmission to the UE.

The UE receiving the ReTx message performs retransmission of the previously-transmitted data. The stop message of FIG. 9 is equal to that of FIG. 8, so that its detailed description will herein be omitted for the convenience of description.

Differently from FIG. 8, the embodiment of FIG. 9 allows the Node-B to transmit the grant message indicating the retransmission, so that the retransmission interrupted by the stop message is initiated as well as the ReTx message.

In more detail, under the condition that the UE does not delete data from the buffer by receiving the stop message and does not perform the retransmission at predetermined retransmission timing due to the stop message, if the above-mentioned UE receives the grant message indicating the retransmission, data kept in the buffer is retransmitted at TTI=13.

In this case, if the UE receives the other grant message indicating the new data transmission instead of the retransmission, it resets the buffer, deletes data kept in the buffer, stores new data in the buffer, so that it may transmit the new data to the Node-B.

Under the above-mentioned situation, there are two statuses, i.e., the retransmission status and the retransmission stop status, so that the Node-B can inform the UE whether the Node-B would retransmit data or would stop transmission of the data using a single bit. In other words, the Node-B informs the UE of the retransmission using the ReTx message, and informs the UE of the retransmission resumption using the stop message.

If the received (Rx) packet is unsuccessfully demodulated, the Node-B transmits the ReTx message to the UE. However, if the Node-B desires to temporarily stop transmission of data applied to the UE at a predetermined retransmission timing irrespective of the success or failure of the demodulation, the Node-B transmits the stop message to the UE.

When the UE receives the stop message from the Node-B, it cannot immediately recognize whether the received stop message is caused by the success of reception, and cannot recognize whether the received stop message aims to temporarily prevent the data from being transmitted to the Node-B at a specific timing point.

The UE stores data in the buffer for a predetermined time. If the above-mentioned UE receives the grant message indicating the retransmission from the Node-B, it retransmits the data stored in the buffer to the Node-B. Otherwise, if the above-mentioned UE receives the other grant message indicating the new data transmission from the Node-B, the UE recognizes that the data stored in the buffer has been successfully received, so that it makes the buffer empty.

Although the grant message indicating the new data transmission is not transmitted from the Node-B, if the retransmission (RxTx) message is not transmitted from the Node-B for a predetermined time, the UE may delete the transmitted (Tx) data from the buffer.

As described above, the incremental redundancy (IR) HARQ scheme can be used for the HARQ scheme. If the synchronous non-adaptive HARQ scheme employing the stop message and the IR version management scheme are combined with each other according to this embodiment, the misunderstanding of the IR version, corresponding to the retransmission action caused by the ReTx grant message located after the stop message, may occur.

While the UE receives the message and attempts to perform the retransmission using the received message, the Rx error of the previously-transmitted stop message may occur. As a result, there arises the misunderstanding of information indicating how many retransmissions are between the UE and the Node-B. Namely, there arises the misunderstanding of information indicating which one of IR versions is applied to the retransmission, so that data reception may be abnormally operated.

Therefore, if the Node-B transmits the grant message indicating the additional retransmission, the above-mentioned embodiment designates the IR version used for ReTx data, and transmits the RxTx data using the designated IR version.

In this case, there is no change in the grant message indicating the retransmission, from among some field areas contained in the other grant message indicating the new data transmission using the synchronous non-adaptive HARQ scheme, so that some fields may not request the setup process. If the Node-B transmits the IR version information using the above-mentioned fields in which the setup process is no longer required, it can transmit the IR version information without adding a new field to the grant message.

For example, there is no change in payload size of Tx data based on the synchronous HARQ scheme, thus, if a payload field of the grant message indicating the new data transmission is transmitted as a ReTx grant message, the payload field is used as a field of information designating IR version. Therefore, although the retransmission is operated after the Node-B transmits the stop message, the correct IR version can be indicated, so that there could be no misunderstanding on the IR version.

For another example, a method for resetting the IR version value to a predetermined value during the retransmission can be used. In other words, this method does not set the actual IR version value in consideration of the previous retransmission, but sets a predetermined value. Thus, if the Node-B transmits the grant message indicating the retransmission after transmitting the stop message, the above-mentioned method resets the IR version value to the predetermined value, and transmits the resultant IR version value to a corresponding UE.

In this case, the Node-B can inform the UE of the reset IR version information using some fields, which are contained in the grant message indicating the new data transmission, without defining a new field.

Figure 10:
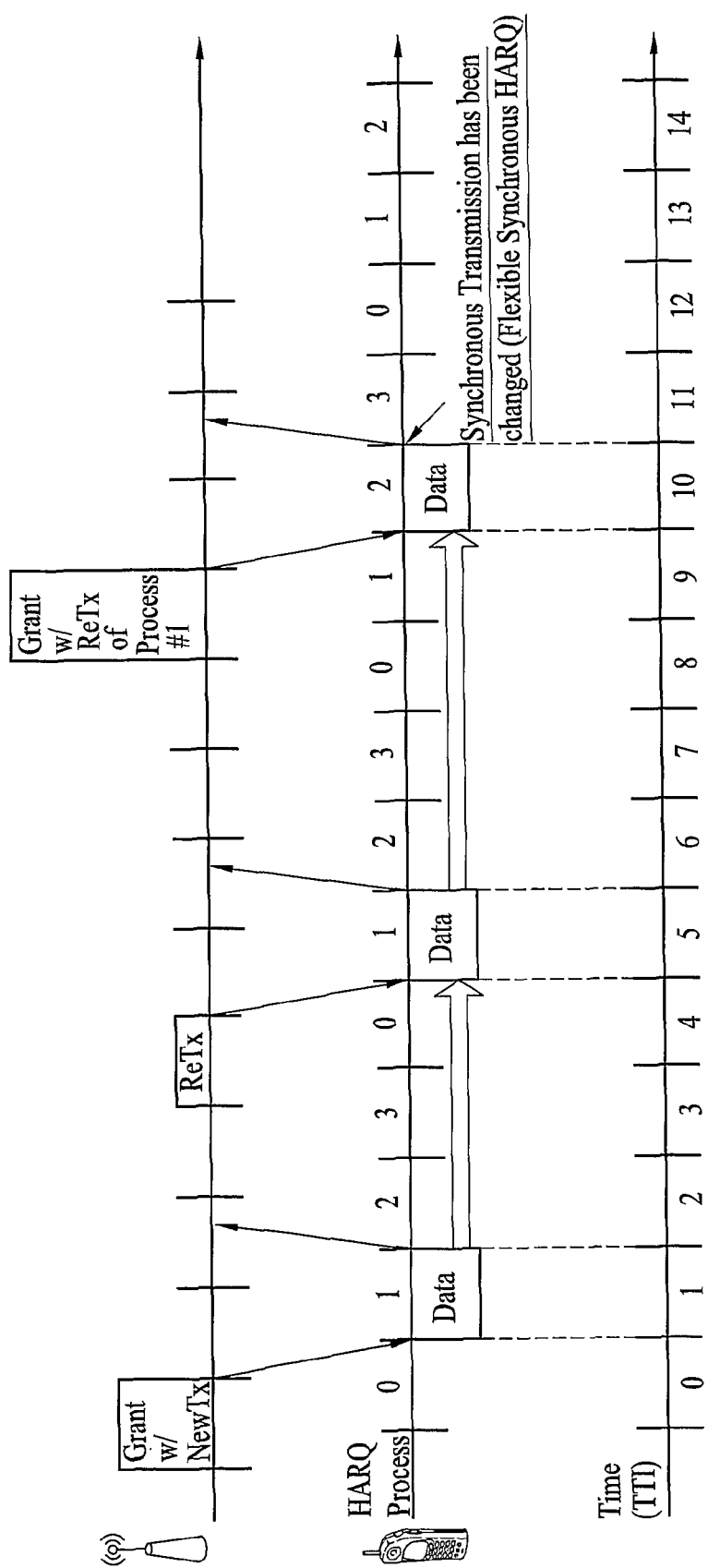
FIG. 10 is a conceptual diagram illustrating a method for transmitting a retransmission request message according to an embodiment of the present invention.

FIG. 10 is a conceptual diagram illustrating a method for transmitting a retransmission request message according to an embodiment of the present invention.

The embodiment of FIG. 10 shows a method for retransmitting data by changing a retransmission timing in the synchronous non-adaptive HARQ scheme based multi-carrier system. In order to allow the UE to perform retransmission of data, it is assumed that the second HARQ process is applied to the embodiment of FIG. 10.

Referring to FIG. 10, the Node-B selects a UE which will perform uplink transmission, and transmits the grant message to the selected UE. The UE receives the grant message, and performs uplink transmission of data according to corresponding scheduling information at TTI=1.

The Node-B receives Tx data from the UE. If the Node-B determines that the Tx data should be retransmitted from the UE, it transmit the ACK/NACK signal to the UE, so that the UE can recognize the presence or absence of a retransmission request.

It is assumed that the multi-carrier system in the above-mentioned embodiment of FIG. 10 employs the synchronous channel-non-adaptive HARQ scheme. If the UE receives the NACK signal from the Node-B, it retransmits the data at a predetermined timing TTI=5. Then, if retransmission of the data is required again, the Node-B transmits the NACK signal so that it requests the UE to perform the retransmission. In this case, the NACK signal is retransmitted at a predetermined timing TTI-9.

However, this embodiment of FIG. 10 provides a method for changing a retransmission timing. In more detail, the Node-B cannot perform retransmission using the resource blocks (RBs), having been used for the ignition transmission, at a pre-engaged timing TTI=9, so that the Node-B requests the UE to perform the retransmission at another timing TTI=10. Thus, the Node-B transmits information of the changed timing to the UE, and the UE performs the retransmission at the changed timing.

In the case of the synchronous HARQ-based system, the timing point, at which the ACK/NACK signal, the ReTx/Stop message, or the grant message is received, is correlated with the other timing point at which data is retransmitted as a response to each signal. In this way, the retransmission timing point can be changed to another as necessary.

For example, in the case of using the grant message indicating the retransmission, the Node-B transmits the grant message to the UE at a specific timing (at which the retransmission can be executed) of the third HARQ process timing. In this case, the above-mentioned grant message must include information indicating that the currently-transmitted ReTx grant message requests retransmission of data associated with the third HARQ process instead of the second HARQ process.

In order to perform the initial transmission and the first retransmission, the UE transmits data using the second HARQ process at corresponding timing intervals TTI=1 and TTI=5. However, during the second retransmission, the UE transmits data at the third HARQ process timing. After receiving the ReTx grant message including the changed HARQ process information, in order to reply to the ReTx grant message, the UE retransmits the data, which has been transmitted at the first HARQ process, at the timing TTI=10 corresponding to the third HARQ process.

If transmission of high-priority data is requested by a corresponding resource block (RB) of a predetermined timing, and the UE has difficulty in performing the retransmission using the predetermined timing and RB information, the above-mentioned operation enables the UE to effectively communicate with the Node-B.

Figure 11:
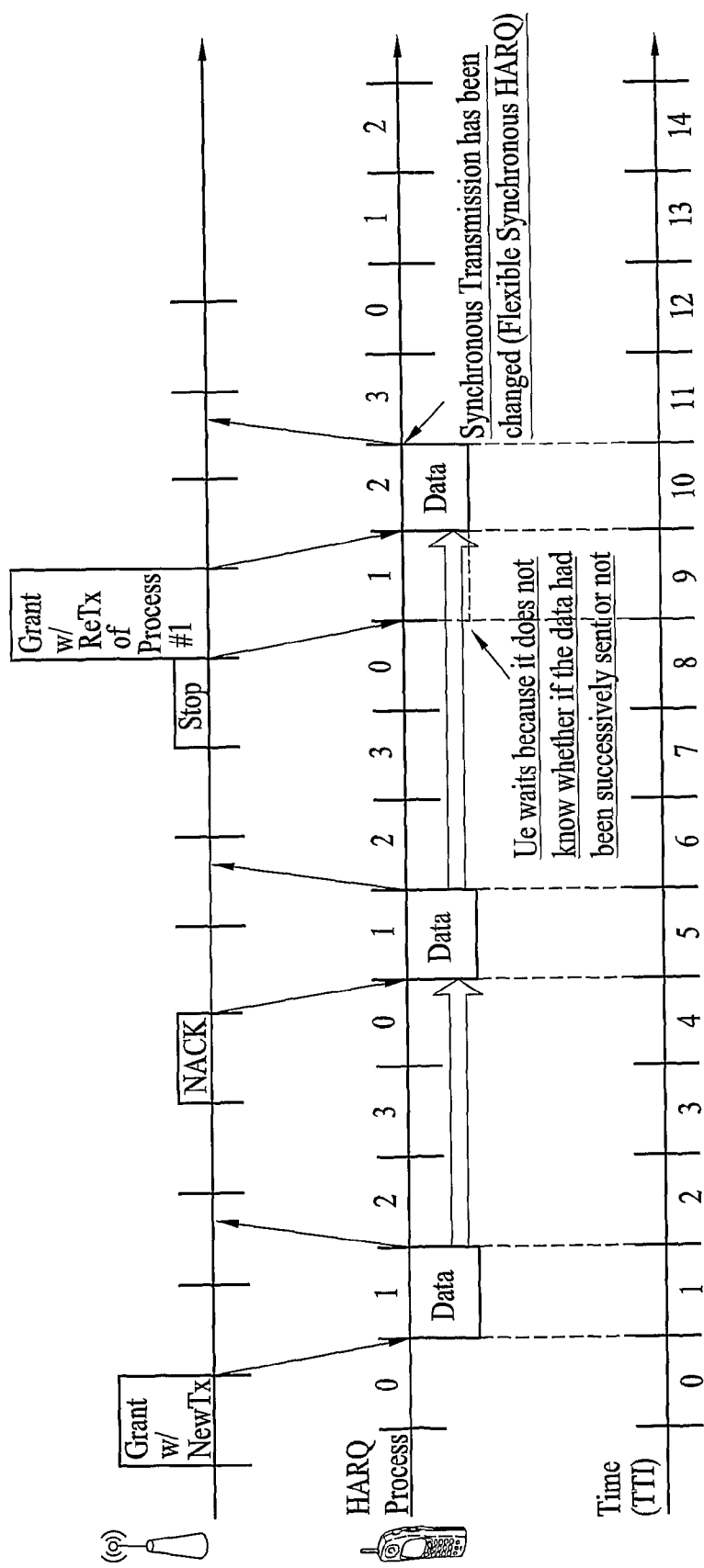
FIG. 11 is a conceptual diagram illustrating a method for simultaneously employing the retransmission stop request message and the retransmission request message according to an embodiment of the present invention.

FIG. 11 is a conceptual diagram illustrating a method for simultaneously employing the retransmission stop request message and the retransmission request message according to an embodiment of the present invention.

The embodiment of FIG. 11 provides a method for more effectively performing the embodiment of FIG. 10 designed to change the retransmission timing, using the stop message. According to this embodiment of FIG. 11, if the retransmission timing desired to be changed is later than the original scheduling timing, the embodiment of FIG. 11 transmits the stop message at the original retransmission timing.

In FIG. 11, if the Node-B performing scheduling cannot allocate the corresponding resource block (RB) to the originally-scheduled UE at the timing TTI=9, the Node-B transmits the stop message to reserve the retransmission to be performed at the timing TTI=9. In this case, although the stop message does not request the UE to perform the retransmission, this stop message enables the UE not to delete corresponding data from the buffer, so that the data is kept in the buffer, as previously stated above.

The Node-B transmits the grant message for requesting the UE to perform the retransmission at the timing TTI=10 used as a retransmission indication timing. In this case, specific information, indicating that retransmission of the data having been transmitted to the second HARQ process is requested, is included in the above-mentioned grant message, so that the UE can correctly recognize which one of data is retransmission-requested by the Node-B.

If the above-mentioned specific information, indicating that retransmission associated with the second HARQ process is requested, is not included in the aforementioned grant message, the UE recognizes that retransmission associated with the third HARQ process is requested at the timing TTI=10 according to the original setup status, so that it has difficulty in implementing a desired effect.

If the retransmission timing is changed as described above, the Node-B is unable to provide the UE with correct information indicating whether data will be transmitted at the predetermined timing. So, if the UE does not receive a retransmission request signal at a predetermined timing, it may wrongly decide whether or not to delete data from the buffer.

However, if the Node-B according to the above-mentioned embodiment of FIG. 11 informs the UE of the stop message, so that it prevents data of the UE from being retransmitted at the predetermined timing. And, resulting in the implementation of no collision between the second HARQ process data and the third HARQ process data can be expected. In brief, a data retransmission method for changing a transmission timing (i.e., HARQ process) using the synchronous HARQ-based scheme can be more effectively performed.

Compared with the method for scheduling the retransmission timing using the stop message, the above-mentioned method of FIG. 11 is superior to the above-mentioned method for scheduling the retransmission method.

Namely, in order to maintain the synchronous non-adaptive HARQ characteristics, the UE must retransmit data according to a retransmission timing based on the second HARQ process. If the data is not retransmitted at the timing TTI=9, the UE must wait for the next retransmission timing TTI=13. However, a method for changing transmission process (i.e., retransmission timing) is also used, so that the data can be retransmitted at the timing TTI=10, resulting in no Tx time delay.

If the Node-B desires to change the ReTx timing to another as described in FIGS. 10 and 11, it is preferable that the Node-B must determine which one of data is retransmission-requested, and must inform the UE of the determined result. In order to retransmit the changed ReTx information, the Node-B may inform the UE of the original HARQ process information of data to be retransmitted at the timing TTI=10.

In this way, in order to inform the UE of the HARQ process information, a new message format is defined and used. If the Node-B transmits the grant message indicating the retransmission, it may transmit the HARQ process information using a specific field from among fields contained in the grant message. In this case, the specific field has no need to be changed during the retransmission.

For example, in the case of the grant message for transmitting new data and the ReTx grant message, there is no change in the payload size of Tx data, so that a field indicating the payload of the message for the new data transmission may be used as the HARQ process indication field.

For another example, in the case of using the grant message indicating the retransmission, a field for indicating the changed HARQ process information in the grant message may be added to the above-mentioned grant message as necessary. By the grant message indicating the retransmission, there is a change in the HARQ process during the retransmission. This HARQ process change can be provided on the assumption that the UE would not normally receive the above-mentioned retransmission grant message. Therefore, if the UE does not receive the ReTx grant message, an unexpected error may occur in overall operations. Therefore, the field indicating the HARQ process information is added to the above-mentioned grant message, so that the Node-B may allocate the HARQ process information to a resource allocation point for the new data transmission, irrespective of the Tx timing.

If the retransmission is operated by the above-mentioned HARQ scheme, the reception end may have two kinds of errors (i.e., ACK-to-NACK error and NACK-to-ACK error) when receiving the ACK/NACK signal.

The ACK-to-NACK error indicates a UE's erroneous decoding operation, in which the UE decodes the ACK signal into the NACK signal due to a channel status or other factors although the Node-B has transmitted the ACK signal to reply to Tx data of a transmission end (e.g., UE).

The NACK-to-ACK error indicates that the UE decodes the NACK signal into the ACK signal due to a channel status or other factors although the Node-B has transmitted the NACK signal for requesting the retransmission upon receiving Tx data from the UE.

Operation schemes for employing the above-mentioned embodiments when the NACK-to-ACK error occurs will hereinafter be described.

Figure 12:
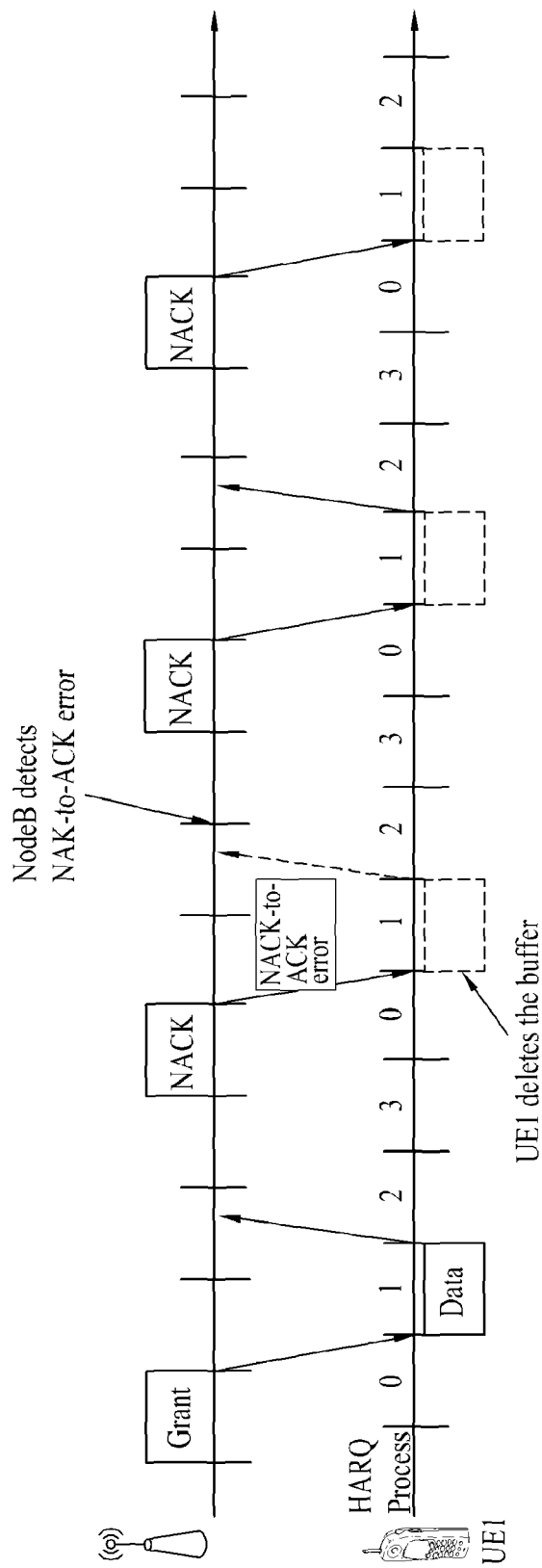
FIG. 12 is a conceptual diagram illustrating a general NACK-to-ACK error.

FIG. 12 is a conceptual diagram illustrating a general NACK-to-ACK error.

Referring to FIG. 12, the Node-B transmits the NACK message after receiving data from the UE, and waits for the UE to retransmit the data. However, if the NACK-to-ACK error occurs, the UE does not wait for the retransmission any longer, and deletes all of data stored in the buffer.

According to the HARQ scheme based on the ACK/NACK signal, although the Node-B waits for retransmitted data from the UE, the UE does not transmit data any longer, so that a time-frequency area is wasted by a predetermined amount corresponding to the maximum number of ReTx times.

The Node-B detects energy using the HARQ scheme, and determines the presence or absence of any error in the ACK/NACK signal using the HARQ scheme. Specifically, the Node-B can determine whether the NACK-to-ACK error occurs. Namely, the Node-B determines that the transmission end (e.g., UE) has not transmitted data to the Node-B on the basis of the detected energy, or determines whether an error has occurred although data has been normally transmitted to the Node-B on the basis of the detected energy.

Figure 13:
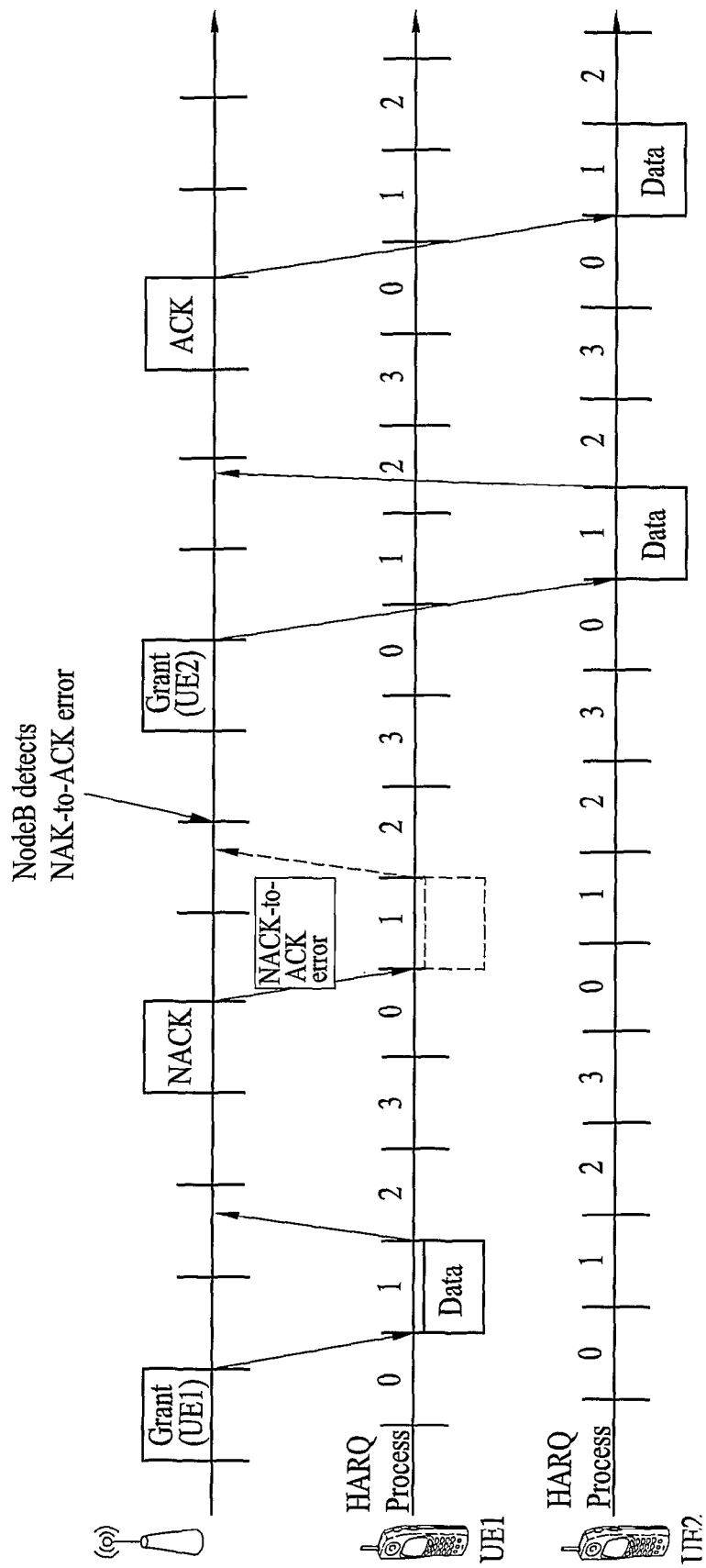
FIG. 13 is a conceptual diagram illustrating an exemplary method for applying an embodiment of the present invention in consideration of the ACK/NACK error.

FIG. 13 is a conceptual diagram illustrating an exemplary method for applying an embodiment of the present invention in consideration of the ACK/NACK error.

If the Node-B detects the NACK-to-ACK error, the embodiment of FIG. 13 provides a new scheduling method for transmitting the UE's new data or new UE's data.

If the Node-B determines the occurrence of the NACK-to-ACK error by detecting the energy, this situation may occur because the UE may not transmit actual data to the Node-B, or may also occur because the UE is in the deep fading status.

If it is determined that the UE was in the deep fading status, the Node-B may prefer to schedule other frequency bands, instead of requesting the retransmission from the UE. Therefore, if the NACK-to-ACK error occurs, the Node-B terminates the prior data retransmission process without requesting the retransmission from the UE, and then performs new scheduling of the next UE where data will be transmitted. In this case, retransmission of the prior data can be operated by an upper layer.

Referring to FIG. 13, a first UE (UE1) receives the grant message from the Node-B, and transmits uplink data to the Node-B. In order to command the UE1 to retransmit the data, the Node-B transmits the NACK signal to the UE1.

However, the UE1 mistakes the NACK signal for the ACK signal although the Node-B has transmitted the NACK signal. Thus, the UE1 does not retransmit the data, and the Node-B detects that a reception (Rx) signal has a weak strength at a specific time at which retransmission data will be received, so that the Node-B detects the occurrence of the NACK-to-ACK error.

Although there is no NACK-to-ACK error (i.e., the UE1 has retransmitted data), the Node-B may mistake the normal operation for the NACK-to-ACK error. In more detail, because the UE1 is in the deep fading status, the Node-B may not receive UE1's retransmission data or may not decode the UE1's retransmission data.

If the NACK-to-ACK error is detected by the Node-B, the retransmission resources pre-scheduled by the synchronous HARQ scheme are used as the UE's new data or scheduling resources of other UEs.

As can be seen from FIG. 13, the Node-B newly allocates resources reserved for the UE1's retransmission to implement data transmission of a second UE (UE2).

If the grant message indicating the aforementioned resources is transmitted to the UE2, the UE2 receives the grant message and transmits uplink data.

Although the Node-B can detect the presence or absence of the NACK-to-ACK error using the above-mentioned method, it cannot prevent the resources from being wasted using only the conventional ACK/NACK operation scheme. As soon as the UE receives the ACK signal, the UE makes its own retransmission buffer empty, so that the UE has no more data to be retransmitted although the Node-B retransmits the NACK signal in order to request retransmission from the UE.

Figure 14:
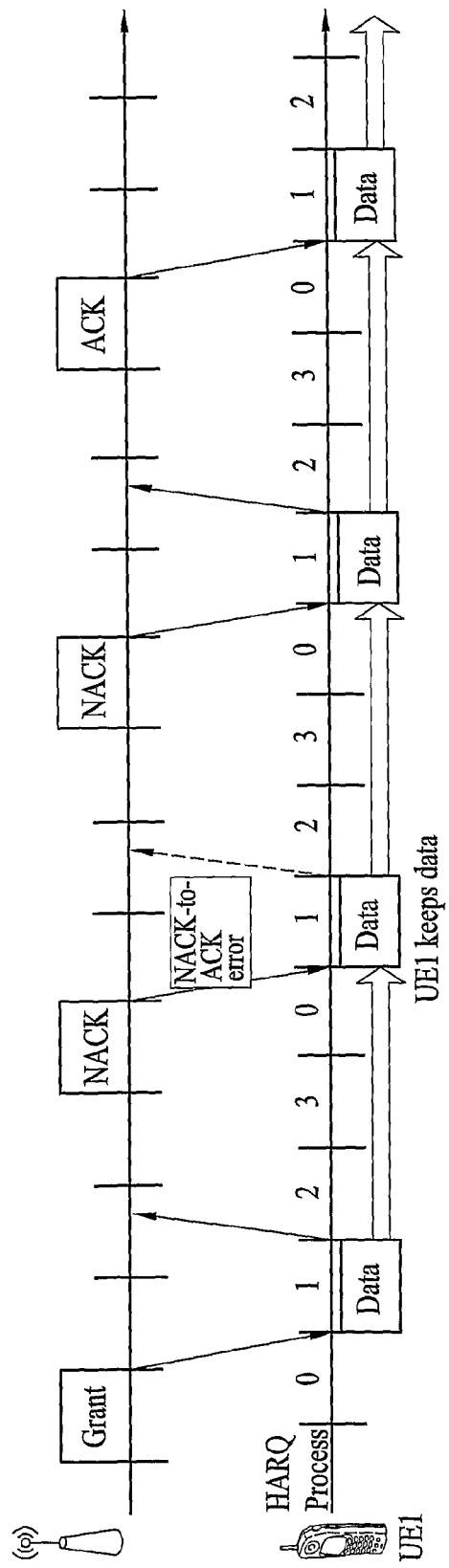
FIG. 14 is a conceptual diagram illustrating another exemplary method for applying an embodiment of the present invention in consideration of the ACK/NACK error.

FIG. 14 is a conceptual diagram illustrating another exemplary method for applying an embodiment of the present invention in consideration of the ACK/NACK error.

The embodiment of FIG. 14 provides a method for maintaining Tx data of a transmission end in the buffer during a predetermined time, without deleting the Tx data from the buffer, although the transmission end does not retransmit data upon receiving the ACK signal from the reception end.

The above-mentioned embodiment of FIG. 14 is similar to functions of the stop message. Namely, this embodiment may be similar to the other embodiment for transmitting the ACK signal used as the stop message. The UE receiving the ACK signal does not retransmit data as if the UE has received the stop message, however, and the previously-transmitted data stored in the buffer is maintained for a predetermined time.

For example, according to the uplink transmission, when receiving the ACK signal from the Node-B, the UE stores retransmission data of in the buffer during a predetermined time without any change, instead of deleting all of data stored in the buffer. Then, if the UE receives again the NACK signal from the Node-B, it immediately retransmits the data stored in the buffer to the Node-B, so that resources are not unnecessarily consumed. In this case, the predetermined time for storing the data may be equal to a time reaching the next retransmission at least.

Figure 15:
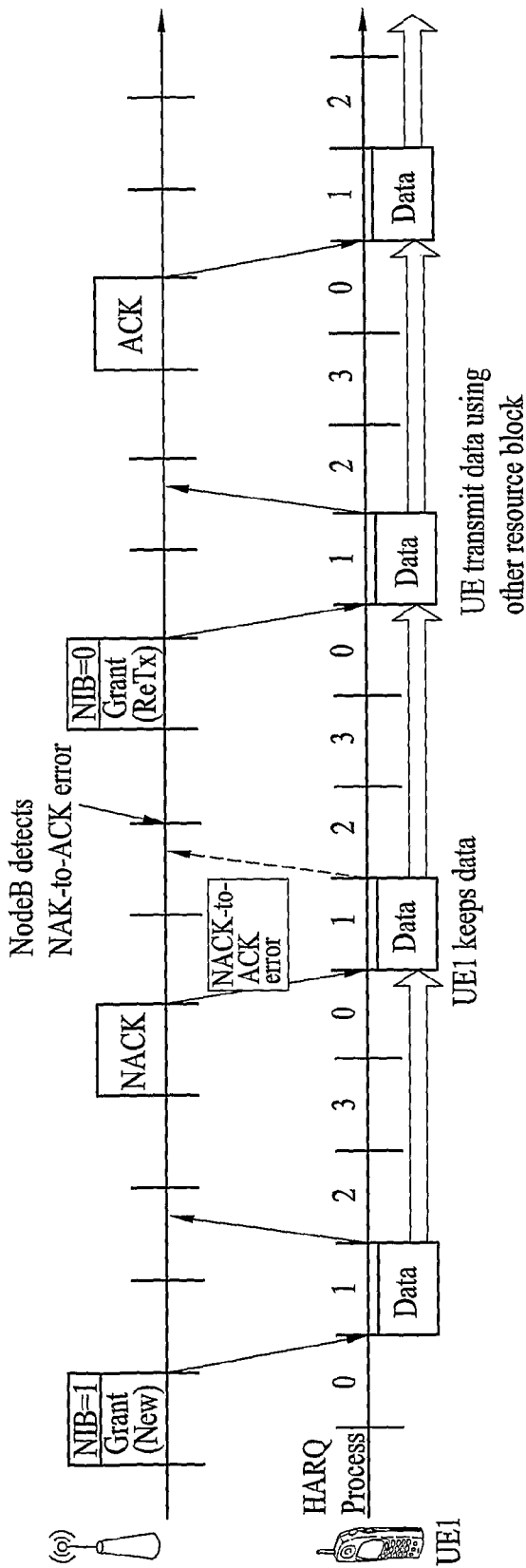
FIG. 15 is a conceptual diagram illustrating another exemplary method for applying an embodiment of the present invention in consideration of the ACK/NACK error.

FIG. 15 is a conceptual diagram illustrating still another exemplary method for applying an embodiment of the present invention in consideration of the ACK/HACK error.

The embodiment of FIG. 15 provides a method for maintaining Tx data of the transmission end in the buffer without deleting the Tx data from the buffer, although the transmission end does not retransmit data upon receiving the ACK signal from the reception end. But, if the ACK/NACK error occurs in the reception end, the embodiment of FIG. 15 provides a method for transmitting the scheduling message.

According to the embodiment of FIG. 15, although the transmission end receives the ACK signal, it continuously stores data in the buffer until receiving a scheduling message for indicating the new data transmission or the retransmission.

The transmission end continuously stores data in the buffer until receiving the scheduling message from the reception end. And, as soon as the transmission end receives the scheduling message indicating the new data transmission from the reception end, it deletes all of data stored in the buffer.

In the uplink transmission, the NACK-to-ACK error occurs, the Node-B confirms the presence of the NACK-to-ACK error by detecting energy, and performs new scheduling as shown in FIG. 13. In this case, under the condition that previous or old data has not been successfully received, the Node-B transmits data to another IE or transmits another data, resulting in an increased FER. Thus, this embodiment of FIG. 15 transmits a scheduling message after detecting the NACK-to-ACK error, so that the Node-B can transmit ReTx data to the erroneous UE using different frequency areas.

This embodiment of FIG. 15 may also be used as a method for allowing the UE to determine the presence or absence of the ACK/NACK error. The UE transmits data, receives the ACK/NACK signal of the data, and determines the presence or absence of the ACK/NACK error by referring to the scheduling message received after the ACK/NACK signal.

The UE is able to determine whether the retransmission is operated at the reception time of the ACK/NACK signal. However, the UE does not finally determine the success or failure of data transmission using only the ACK/NACK signal, determines the presence or absence of errors of the ACK/NACK signal by referring to the scheduling message, and decides whether or not to delete data from the buffer by referring to the scheduling message.

For example, if it is determined that the UE receives the ACK signal, the UE does not retransmit data at the retransmission timing, and continuously maintains the data in the buffer at the same retransmission timing.

Thereafter, if the UE receives the grant message indicating the new data transmission, it deletes the data from the buffer, and transmits the new data. Under this situation, it is considered that the above-mentioned ACK signal received in the UE has no error. Otherwise, if the UE receives the grant message indicating the retransmission from the Node-B, it retransmits the data stored in the buffer. Under this situation, it is considered that the above-mentioned ACK signal received in the UE has errors.

In the meantime, if the Node-B transmits a scheduling message (e.g., the grant message indicating the retransmission) to the UE, operations of the Node-B and the UE may be equal or similar to those of the method of FIG. 4. The retransmission is operated by the grant message, so that only the locations of used resource blocks (RBs) are changed to other locations, but the MCS level or other components may be equal to those of the initial transmission. Otherwise, all of the RB location, the number of used RBs, and the MCS level may also be changed to others. In this case, the MCS level may be pre-defined between the Node-B and the UE on the basis of the payload size of Tx data and the number of used RBs.

A method for determining which one of the new data transmission and the retransmission is indicated by the grant message shown in FIG. 15 may be equal or similar to those of the methods of FIGS. 5~7.

In this case, the grant message includes the ACK/NACK information, so that there is no need to additionally the ACK/NACK information. In more detail, a reception end of data (e.g., Node-B) may simultaneously transmit the ACK/NACK signal and the grant message. However, if the Node-B transmits the grant message, there is no need to transmit the ACK/NACK signal. If the UE receives the grant message indicating the retransmission from the Node-B, it disregards the received ACK/NACK signal, and performs the retransmission via the resource area requested by the Node-B.

Figure 16:
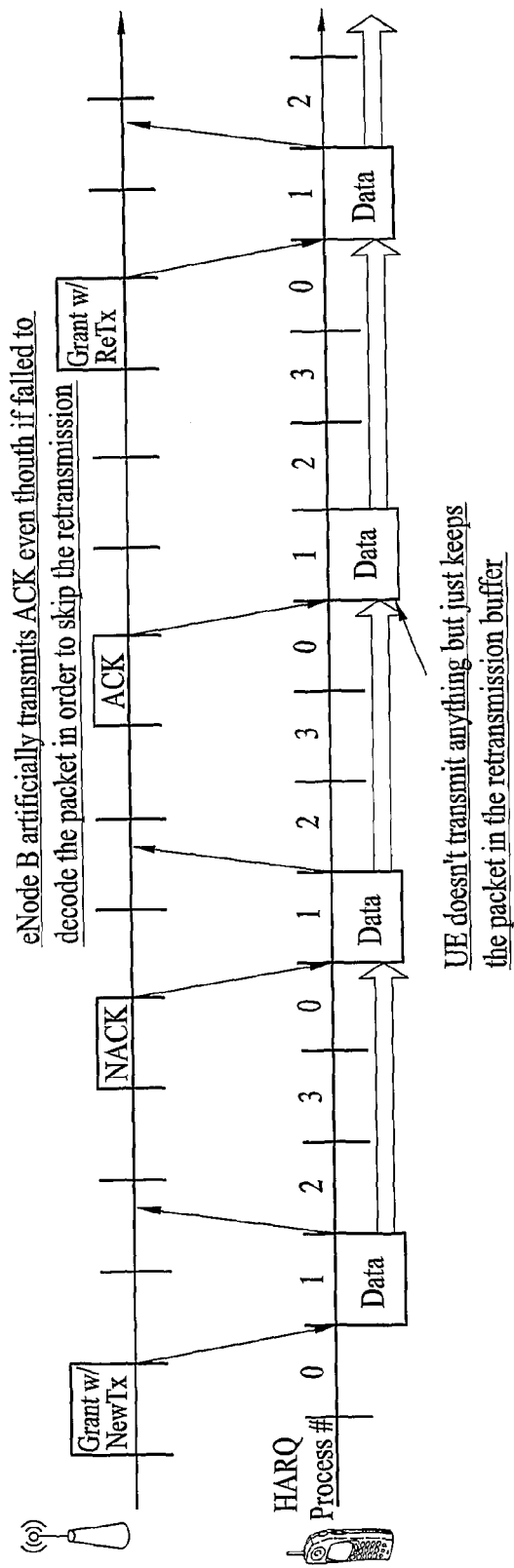
FIG. 16 is a conceptual diagram illustrating a method for controlling retransmission via the ACK/NACK message according to an embodiment of the present invention.

FIG. 16 is a conceptual diagram illustrating a method for controlling retransmission via the ACK/NACK message according to an embodiment of the present invention.

The embodiment of FIG. 15 provides a method for continuously storing Tx data in a buffer for a predetermined time although the UE receives the ACK signal, so that the Node-B can more effectively schedule resources. After the UE receives the ACK signal, it continuously stores Tx data in the buffer for the predetermined time.

Thus, although the Node-B has not successfully received the data from the UE, it compulsorily transmits the ACK signal so that a retransmission operation of a specific UE can be temporarily interrupted. If there is no uplink resource to be allocated to a corresponding retransmission UE at the retransmission timing, the scheduling can be more flexibly operated.

The UE receiving the ACK signal does not retransmit data at a corresponding time, but it does not delete the data from the buffer until receiving the grant message. As a result, the Node-B transmits the grant message indicating the retransmission to the UE at a desired time, so that it restarts retransmission of a corresponding process by transmitting the grant message indicating the retransmission at a desired time.

The above-mentioned retransmission interruption may also be operated by the other grant message indicating the retransmission. For example, the RB size of the grant message indicating the retransmission is set to "0", so that uplink retransmission of the corresponding terminal can be temporarily interrupted. In this case, the Node-B restarts retransmission of a corresponding process by transmitting the grant message indicating the retransmission at a desired time.

The present invention can be applied to an uplink of the 1×EV-DO synchronous system, and can also be applied to an uplink of the 3GPP LTE (Long Term Evolution due to less overhead.

The above-mentioned embodiments of the present invention can be implemented by hardware, firmware, software, or a combination of them.

In the case of implementing the present invention by hardware, the present invention can be implemented with ASICs (application specific integrated circuit), DSPs (digital signal processors), DSPDs (digital signal processing devices), PLDs (programmable logic devices), FPGAs (field programmable gate arrays), a processor, a controller, a microcontroller, and a microprocessor, etc.

If operations or functions of the present invention are implemented by firmware or software, the present invention can be implemented in the form of a variety of formats, for example, modules, procedures, and functions, etc. The software codes may be stored in a memory unit so that it can be driven by a process. The memory unit is located inside or outside of the processor, so that it can communicate with the aforementioned processor via a variety of well-known parts.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As apparent from the above description, if the retransmission method for the multi-carrier system is based on a channel-non-adaptive retransmission scheme, the present invention can flexibly or smoothly schedule retransmission resources.

If the retransmission method for the multi-carrier system is based on a synchronous retransmission scheme, the present invention can flexibly or smoothly schedule the retransmission timing point. Also, the present invention can more effectively perform the synchronous channel-non-adaptive HARQ scheme.

The present invention can properly cope with the ACK/NACK errors, so that a communication performance increases.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of data retransmission using a HARQ (Hybrid Automatic Repeat reQuest) scheme in a multi carrier system, the method comprising:
   receiving, by a user equipment (UE) from a base station (BS), a first grant message including first resource allocation information for an uplink data transmission and a first new data indicator (NDI) indicating transmission of a new uplink data or retransmission of the uplink data;
   transmitting, by the UE to the BS, the uplink data using the first resource allocation information when the first NDI indicates the new uplink data transmission;
   receiving, by the UE from the BS, an HARQ acknowledgement message for the uplink data;
   maintaining, by the UE, the uplink data in a buffer until a predetermined condition is satisfied even though the HARQ acknowledgment message is detected as a positive acknowledgement (ACK) message;
   receiving, by the UE from the BS, a second grant message including second resource allocation information for the uplink data transmission and a second NDI;
   setting, by the UE, the HARQ acknowledgement message to a negative acknowledgement (NACK) message when the second NDI is not toggled compared with the first NDI even though the HARQ acknowledgment message is detected as the ACK message; and
   retransmitting, by the UE to the BS, the uplink data using the second resource allocation information.

2. The method according to claim 1, wherein the HARQ acknowledgement message is determined to have an error when the second NDI is not toggled compared to the first NDI.

3. The method according to claim 1, wherein the second grant message further includes redundancy version information for the data retransmission.

4. The method according to claim 1, wherein the first resource allocation information includes at least a first transmission timing, a first transmission resource block, a number of the first transmission resource block, or first MCS (Modulation and Coding Scheme) information, and
   the second resource allocation information includes at least a second transmission timing, a second resource block, a number of the second transmission resource block, or second MCS (Modulation and Coding Scheme) information.

5. A User Equipment (UE) performing a method of data retransmission using a HARQ (Hybrid Automatic repeat request) scheme in a multi carrier system, the UE comprising:
   a transmission module transmitting or retransmitting uplink data;
   a receiving module receiving messages used for the data retransmission; and
   a processor controlling the transmission module and the receiving module to perform the data retransmission using the HARQ scheme,
   wherein the UE is configured to:
   receive, from a base station (BS), a first grant message including first resource allocation information for an uplink data transmission and a first new data indicator (NDI) indicating a new uplink data transmission or retransmission of the uplink data by using the receiving module;
   transmit, to the BS, the uplink data using the first resource allocation information by using the transmission module;
   receive, from the BS, an HARQ acknowledgement message for the uplink data by using the receiving module;
   maintain the uplink data in a buffer until a predetermined condition is satisfied even though the HARQ acknowledgment message is detected as a positive acknowledgement (ACK) message;
   receive, from the BS, a second grant message including second resource allocation information and a second NDI by using the receiving module;
   set the HARQ acknowledgement message as a negative acknowledgement (NACK) message when the second NDI is toggled compared with the first NDI; and
   retransmit the uplink data using the second resource allocation information by using the transmitting module.

6. The UE according to claim 5, wherein the processor determines that the HARQ acknowledgement message has an error when the second NDI is not toggled compared to the first NDI.

7. The UE according to claim 5, wherein the second grant message further includes redundancy version information for the data retransmission.

8. The UE according to claim 5, wherein the first resource allocation information includes at least a first transmission timing, a first transmission resource block, a number of the first transmission resource block, or first MCS (Modulation and Coding Scheme) information, and the second resource allocation information includes at least a second transmission timing, a second resource block, a number of the second transmission resource block, or second MCS (Modulation and Coding Scheme) information.

* * * * *